United States Patent [19]

Harbour, Jr. et al.

[11] 4,303,925

[45] Dec. 1, 1981

[54] METHOD AND APPARATUS FOR CONTROLLING THE POSITION OF PRINTED INK DROPLETS

[75] Inventors: Wilmer P. Harbour, Jr.; Roderick S. Heard, both of Lexington, Ky.

[73] Assignee: International Business Machines Corporation, Armonk, N.Y.

[21] Appl. No.: 52,692

[22] Filed: Jun. 27, 1979

[51] Int. Cl.[3] ........ G01D 15/18

[52] U.S. Cl. ........ 346/1.1; 346/75

[58] Field of Search ........ 346/75, 1; 400/126

[56] References Cited

U.S. PATENT DOCUMENTS

| | | | |
|---|---|---|---|
| 3,813,676 | 5/1974 | Wolfe | 346/75 |
| 3,828,354 | 8/1974 | Hilton | 346/75 X |
| 3,834,505 | 9/1974 | Fowler | 346/75 X |
| 3,947,853 | 3/1976 | Denny | 346/75 |
| 3,958,252 | 5/1976 | Kashio | 346/75 |
| 3,959,797 | 5/1976 | Jensen | 346/75 X |
| 4,115,787 | 9/1978 | Fujimoto | 346/75 |
| 4,115,788 | 9/1978 | Takano | 346/75 |
| 4,216,480 | 8/1980 | Buehner | 346/75 |

FOREIGN PATENT DOCUMENTS

| | | |
|---|---|---|
| 1472 | 4/1979 | European Pat. Off. . |
| 2008890 | 6/1979 | United Kingdom . |

OTHER PUBLICATIONS

Buehner et al.; Application of I. J. Technology to a Word Processing Output Printer; IBM Journal of R.& D., vol. 21, No. 1, Jan. 1977, pp. 2-9.

Billings; T. L.; Improvement of Sloped-Line Appearance in Dot Matrix Printing; IBM Tech. Disc. Bulletin, vol. 21, No. 6, Nov. 1978.

*Primary Examiner*—Joseph W. Hartary

*Attorney, Agent, or Firm*—Frank C. Leach, Jr.; William J. Dick

[57] ABSTRACT

Each ink droplet printed on a recording surface, which has relative movement along a first axis with respect to ink droplet producing means, forms part of a character, and may be disposed in any granular position in a second direction, which is substantially orthogonal to the first axis, relative to a single predetermined position, which is the gutter stream position. Information concerning the location on the recording surface of each printed droplet relative to the single predetermined position in the second direction and to the prior printed droplet or a margin along the first axis is stored in a read-only storage (ROS). The information concerning the location of the droplet in the second direction is a voltage applied to charging means with the magnitude of the voltage in conjunction with any induction created by prior adjacent droplets of the ink stream determining the deflection of the droplet. Synchronization of the relative movement along the first axis with respect to the generation of the droplets is obtained whenever there is a predetermined spacing between the printed droplets along the first axis after it has been determined that synchronizaton is required.

20 Claims, 29 Drawing Figures

METHOD AND APPARATUS FOR CONTROLLING THE POSITION OF PRINTED INK DROPLETS

In printing characters by a dot printer such as an ink jet printer in which ink droplets are produced or a wire matrix printer in which each wire is actuated by a solenoid hammer to produce a dot, print quality is strongly affected by the size of the dot and the capability of placing the dot at a desired position. High print quality is obtainable as the size of the dot and its spacing decreases. However, the size of the dot is limited in an ink jet printer by the minimum size of the ink droplet to obtain stable droplet placement and in a wire matrix printer by the minimum size of the wire to avoid breakage of the wires when striking the recording surface.

For a given character print rate, more small spots or dots are required in a fixed interval of time than large spots. Therefore, throughput requirements of a printer may result in a larger spot size being required than can produce high quality print.

Thus, print quality is a strong function of the position of the dot for a specific size of the dot. One means of controlling the position of each of the dots has been to employ a fixed grid or matrix with each area of the grid or matrix being a square the length of whose side equals the minimum spacing between droplets. To obtain solid fill of each square area of the grid or matrix, the spacing should be no more than the quotient of the diameter of the droplet divided by the square root of 2.

This utilization of a fixed grid or matrix for positioning each of the droplets produces a character having a digitized appearance. Thus, for curves or diagonal lines other then 45°, the characters have distinct steps, thin places, and thick places.

Therefore, while the print pattern has the required square areas filled when using a fixed grid or matrix, most characters have this digitized appearance. This digitized appearance affects print quality.

Some improvement in print quality can be obtained by allowing greater freedom in placing the entire vertical or horizontal segments of dots while still maintaining the minimum dot spacing in each segment. For example, the droplets in a second vertical segment can be moved up one-half a grid space with respect to the droplets in a first vertical segment so that there is overlapping. A similar arrangement could be employed in the horizontal direction. This flexibility in the vertical direction mainly improves the quality of lines having low angles to the horizontal while this flexibility in the horizontal direction mainly improves lines with low angles to the vertical.

Vertical flexibility is relatively easily obtained in an ink jet printer of the raster type without affecting throughput since a fixed increment of deflection can be added to the entire raster. However, the combination of vertical flexibility with horizontal flexibility in an ink jet printer of the raster type is obtained only with a reduction in throughput since additional time must be allowed to print additional raster positions.

Horizontal flexibility is easily obtainable in a wire matrix printer if conflicts with minimum hammer cycle time can be avoided. However, the combination of horizontal flexibility with vertical flexibility in a wire matrix printer is obtained only with a decrease in throughput since additional passes or sweeps would be required for each line of print.

The present invention overcomes the digitized appearance of a character irrespective of the angle of the line with respect to the horizontal or vertical or the curvature of the line. The present invention accomplishes this through free-form placement of each droplet in which each droplet is disposed at any location with respect to the prior printed droplet so that the desired positioning of each droplet is obtained. Furthermore, high throughput is obtainable.

The present invention accomplishes the free-form placement of each printed droplet through providing a charge of a selected magnitude on each printed droplet to position each droplet at a desired location in one direction, which is substantially orthogonal to an axis in which there is relative movement between the recording surface and the ink droplet producing means. The time at which the specific droplet is printed is controlled relative to the time that the previous printed droplet was printed. Therefore, with the present invention, each printed droplet can be disposed relative to a predetermined position in the one direction rather than relative to the vertical spacing with respect to the prior printed droplet in the one direction. Thus, there is no requirement or need for the droplets to be printed in monotonically ascending spot sequence in a particular scan, for example.

An object of this invention is to provide an improved ink jet printer.

Another object of this invention is to provide a method and apparatus for controlling the position of each printed ink droplet of an ink jet printer.

A further object of this invention is to provide an ink jet printer having free-form placement of the printed droplets.

The foregoing and other objects, features, and advantages of the invention will be more apparent from the following more particular description of the preferred embodiments of the invention as illustrated in the accompanying drawings.

Figure 1:
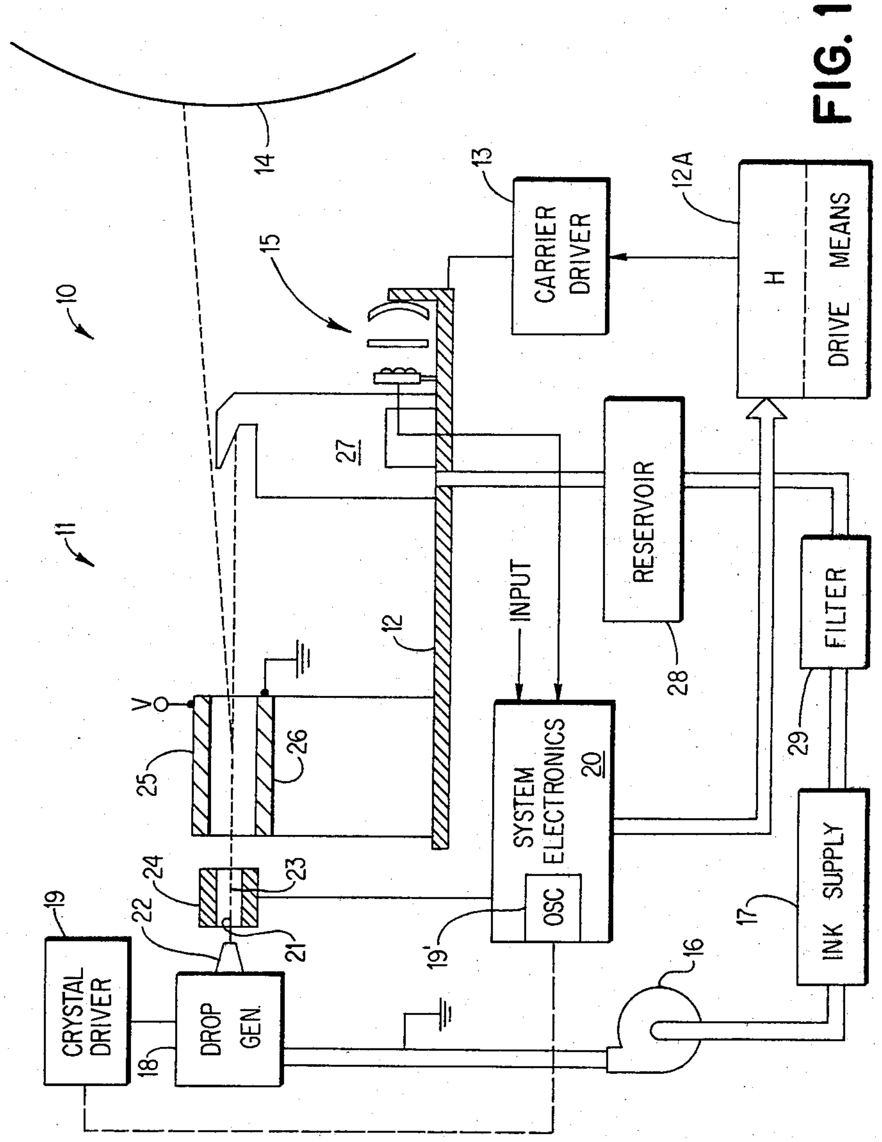
FIG. 1 is a schematic view of a portion of an ink jet printer with which the control apparatus of the present invention is employed.

Referring to the drawings and particularly FIG. 1, there is shown an ink jet printer 10 of the type more particularly shown and described in the copending patent application of William L. Buehner, et al, for "Multiple Speed Ink Jet Printer," Ser. No. 960,417, filed Nov. 13, 1978, now U.S. Pat. No. 4,216,480, assigned to the same assignee as the assignee of this application. The ink jet printer 10 has an ink jet head assembly 11 arranged on a carrier 12, which is driven from drive means 12A through a carrier driver 13 for movement from left to right and conversely relative to a recording surface 14 such as paper, for example, on a rotary drum for example. Thus, there is relative movement along a first axis between the ink jet head assembly 11 and the recording surface 14.

Furthermore, the recording surface 14 is moved in a direction, which is substantally orthogonal to the first axis in the area in which printing occurs. The recording surface 14 can be moved continuously through the drum rotating continuously or be indexed through the drum being moved incrementally at the end of each sweep or pass of the ink jet head assembly 11 along the first axis. Additionally, the recording surface 14 could be mounted on a flat surface and moved in a vertical direction, either continuously or indexed at the end of each sweep or pass of the ink jet head assembly 11 along the first axis. Thus, there is relative movement between the ink jet head assembly 11 and the recording surface 14 in a second direction substantially orthogonal to the first axis.

A grating 15 is employed to determine the horizontal position (i.e., along the first axis) of the ink jet head assembly 11. Thus, the grating 15 enables the specific location of the ink jet head assembly 11 along the horizontal axis at various time intervals to be ascertained. One suitable example of the grating 15 is shown and described in the copending patent application of David R. Cialone, et al, for "Bi-Directional Self-Imaging Grating Detection Apparatus,38 Ser. No. 920,305, filed June 28, 1978, now U.S. Pat. No. 4,180,703, and assigned to the same assignee as the assignee of this application.

The ink jet head assembly 11 includes a pump 16 for directing ink under pressure from an ink supply 17 to a drop generator 18. The drop generator 18 includes a transducer for applying perturbations to the ink when the transducer is energized from a crystal driver 19, which is activated by an oscillator 19' within system electronics 20, at a relatively high frequency such as 117 kHz, for example.

An ink stream 21 flows from a nozzle 22 of the drop generator 18. The perturbations applied to the ink stream 21 from the drop generator 18 break up the stream 21 into droplets 23 within a charge electrode 24. The magnitude of the charge of each of the droplets 23, which is to be printed, is controlled by the present invention so that each of the droplets 23, which is to be printed on the recording surface 14, is deflected to a desired position on the recording surface 14 after passing between a pair of deflection plates 25 and 26 prior to striking the recording surface 14.

Since a constant potential is applied across the plates 25 and 26, the magnitude of the charge on each of the charged droplets 23 determines the amount of deflection of the charged droplet 23 during its movement towards the recording surface 14. Thus, the magnitude of the voltage applied to the charge electrode for each of the charged droplets 23 along with induction produced by the prior adjacent droplets 23 in the ink stream 21 determines the position of the recording surface 14 to which the charged droplet 23 is deflected.

If the droplet 23 is not required for printing, it is directed to a gutter 27 for passage to a reservoir 28, which is connected to the ink supply 17 through a filter 29. The droplets 23, which are not used for printing, are not charged other than to compensate for induction produced by the prior adjacent droplets 23 in the ink stream 21.

Figure 21:
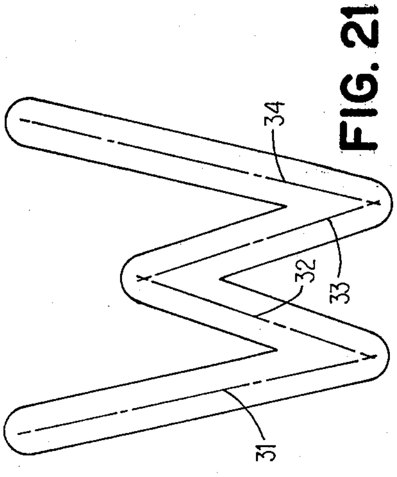
FIG. 21 is a view of an ideal "W" character.

Referring to FIG. 21, there is shown an ideal character "W". The ideal character "W" has a left outer center line line 31, a left inner center line 32, a right inner center line 33, and a right outer center line 34. The left outer center line 31 and the left inner center line 32 intersect at their bottom ends, the left inner center line 32 and the right inner center line 33 intersect at their top ends, and the right inner center line 33 and the right outer center line 34 intersect at their bottom ends and in the same horizontal plane as the intersection of the left outer center line 31 and the left inner center line 32.

Figure 22:
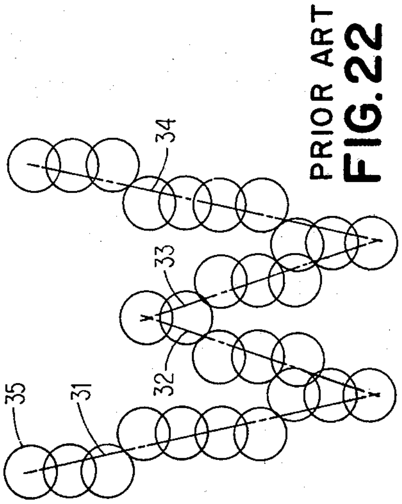
PRIOR ART FIG. 22
FIG. 22 is a view showing the positions of ink dots to produce the character "W" when using a fixed grid or matrix.

When ink dots 35 are utilized with a fixed grid or matrix to produce the character "W," the arrangement of the ink dots 35 is shown in FIG. 22 wherein very few of the dots 35 have their centers on any of the center lines 31, 32, 33, and 34. Only the dots 35 at the top and bottom of the left outer center line 31, at the top and bottom of the right center line 34, and at the intersection of the center lines 32 and 33 have their centers on the center lines. Thus, an uneven character "W" is produced when using a fixed grid or matrix.

Figure 23:
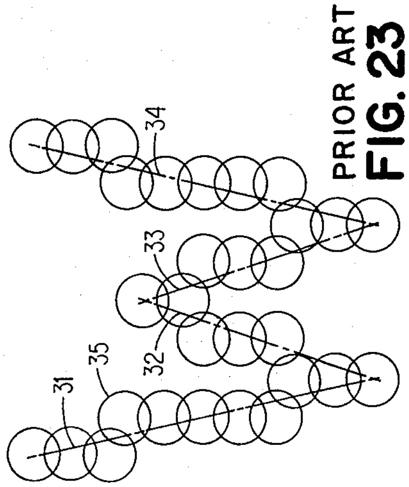
PRIOR ART FIG. 23
FIG. 23 is a view showing the positions of ink dots to produce the character "W" when using a fixed grid or matrix with the dots in some adjacent vertical segments being shifted a half step in the vertical direction relative to the prior vertical segment.

Some improvement in print quality is obtained by moving the dots 35 in some vertical segments a vertical distance equal to half the grid spacing. This is shown in FIG. 23.

As previously mentioned, movement of the dots 35 in the vertical direction creates improvement mainly in lines having low angles to the horizontal. Thus, the print quality of the character "W" produced in FIG. 23 by the use of vertical half step is not much better than that shown in FIG. 22.

Figure 24:
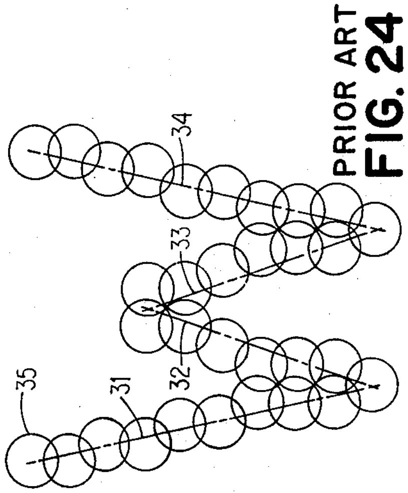
PRIOR ART FIG. 24
FIG. 24 is a view showing the positions of ink dots to produce the character "W" when using a fixed grid or matrix with the dots in same adjacent vertical segments being shifted a half step in the horizontal direction relative to the prior vertical segment.

However, as previously mentioned, improvement in print quality of lines with low angles to the vertical is accomplished by shifting the dots 35 in some vertical segments in the horizontal direction. This is shown in FIG. 24 wherein the dots 35 in some vertical segments are moved in the horizontal direction a distance equal to half the grid spacing so that there is overlapping of the dots 35. Thus, in FIG. 24, the centers of the uppermost dot 35, the third dot 35, the eighth dot 35, and the last dot 35 are on the left outer center line 31. This is an improvement over the arrangement of FIG. 22 in which only two of the dots 35 have their centers on the left outer center line 31 and over the arrangement of FIG. 23 in which there are only three of the dots 35 with their centers on the left outer center line 31.

Figure 25:
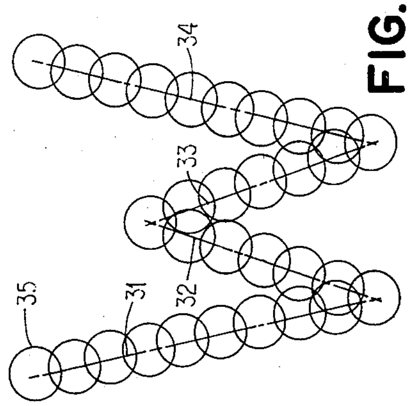
FIG. 25 is a schematic view showing the positions of ink dots to produce the character "W" in accordance with the control apparatus of the present invention when only a single dot line width is used.

With the control apparatus of the present invention, each of the dots 35, as shown in FIG. 25, can be disposed so that its center is on one of the center lines 31, 32, 33, and 34. There also is overlapping of each of the dots 35. Thus, with the control apparatus of the present invention, the center of each of the dots 35 would be on one of the center lines 31, 32, 33, and 34 if only a single row of the dots 35 is required. This is a comparison with the other arrangements in FIGS. 22–24 in which only the single row of the dots 35 is used to form the character "W" at each position.

Figure 26:
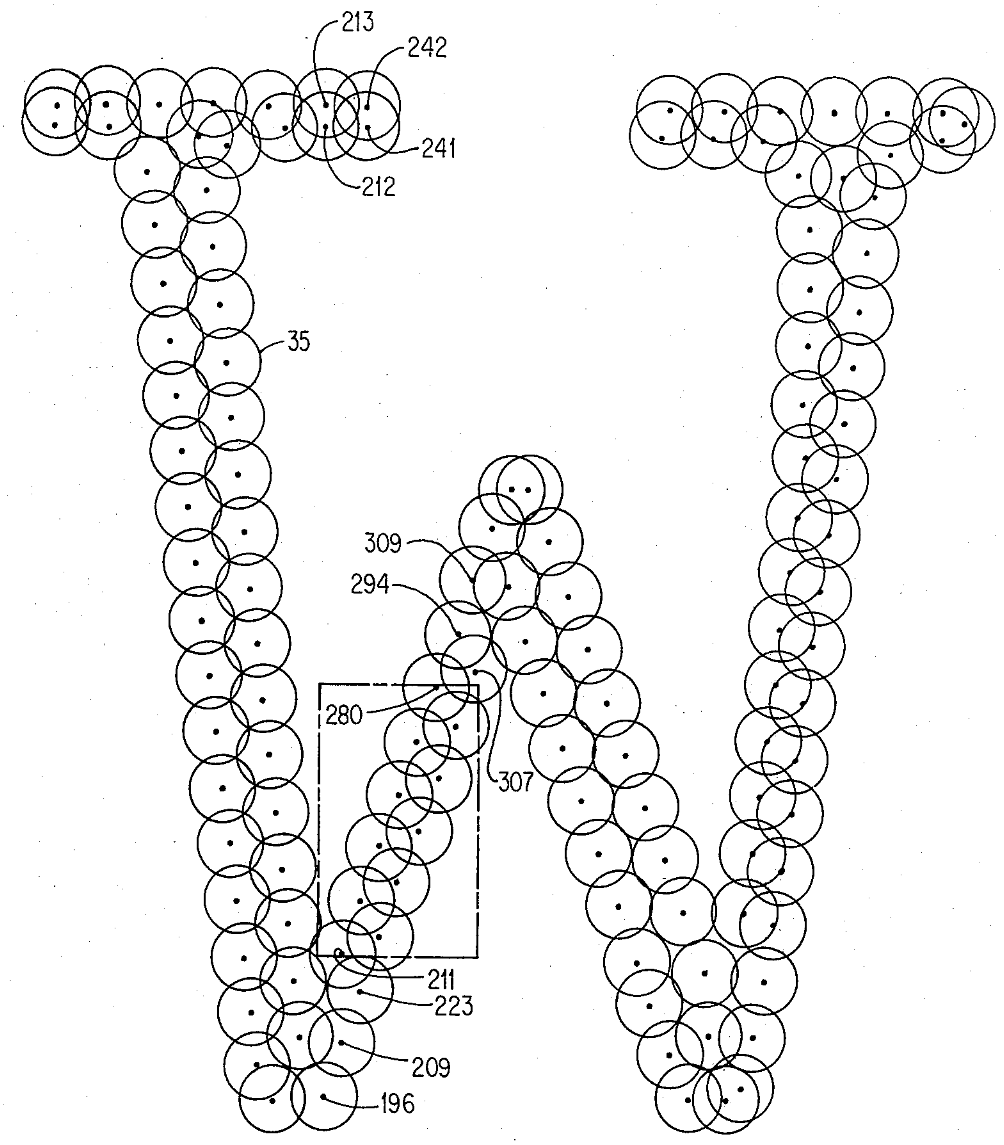
FIG. 26 is a view showing the positions of all of the ink dots utilized to form the character "W" when using the control apparatus of the present invention with certain portions of the character "W" being thicker than other portions.

However, high quality type design requires that the character "W" utilize several different line widths such that the dots 35 cannot have their centers on the center lines 31, 32, 33, and 34. However, they can be arranged as desired by the control apparatus of the present invention as shown in FIG. 26.

Figure 2:
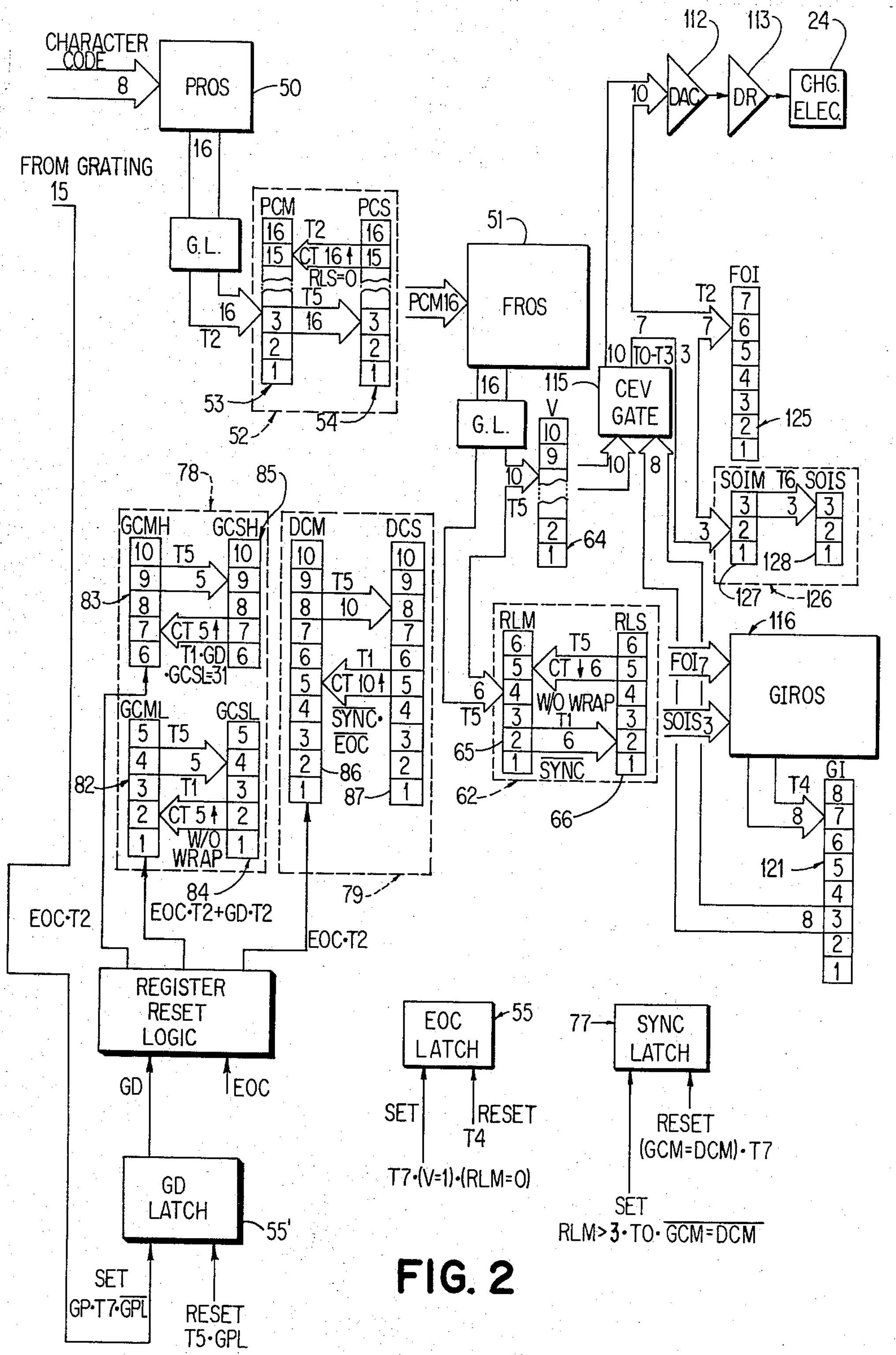
FIG. 2 is a schematic block diagram of the apparatus for controlling the printing of the droplets of the ink jet printer.

Referring to FIG. 2, there is shown a pointer read only storage (PROS) 50 receiving a character code of eight bits as an address with the character code identifying the character to be printed. The character code of eight bits determines which word stored in the PROS 50 is initially selected. The PROS 50 could have two hundred and fifty-six words with each word being sixteen bits. The output of the PROS 50 is employed to identify a location within a font read only storage (FROS) at which the data to print the character, which the character code of eight bits identifies, is to begin. The FROS 51 has up to 65,536 words with each word being sixteen bits. About 16,000 words are needed for a 100-character Roman style type font.

The sixteen-bit word from the PROS 50 is gated to a pointer counter 52, which comprises a master pointer counter (PCM) 53 and a slave pointer counter (PCS) 54 cooperating with each other. The PCM 53 addresses the FROS 51 directly and accesses each line in the FROS 51 sequentially in an upward direction.

Figure 3A:
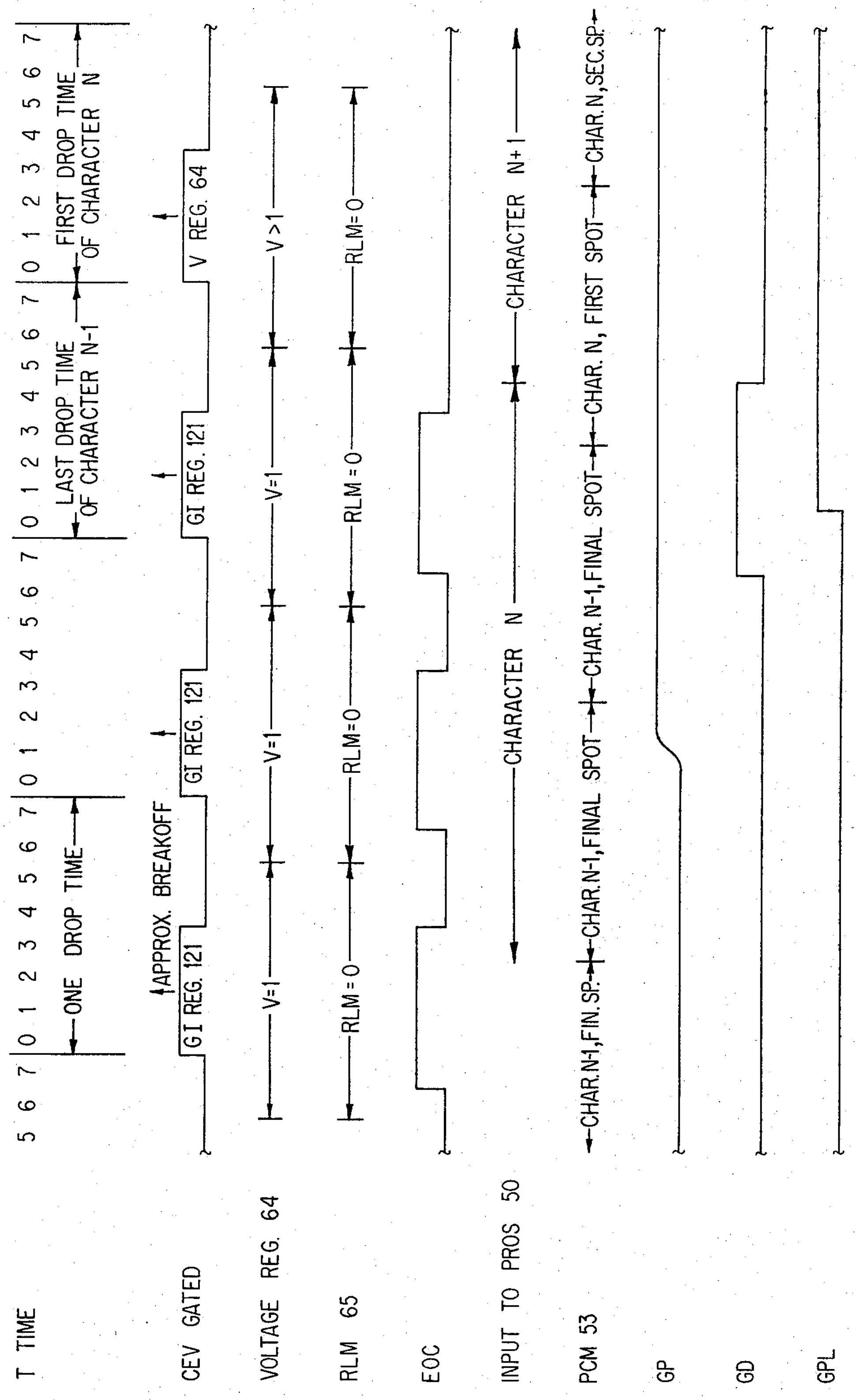
FIGS. 3A and 3B are timing diagrams showing the relationship of various signals produced by the control apparatus of the present invention.
Figure 3B:
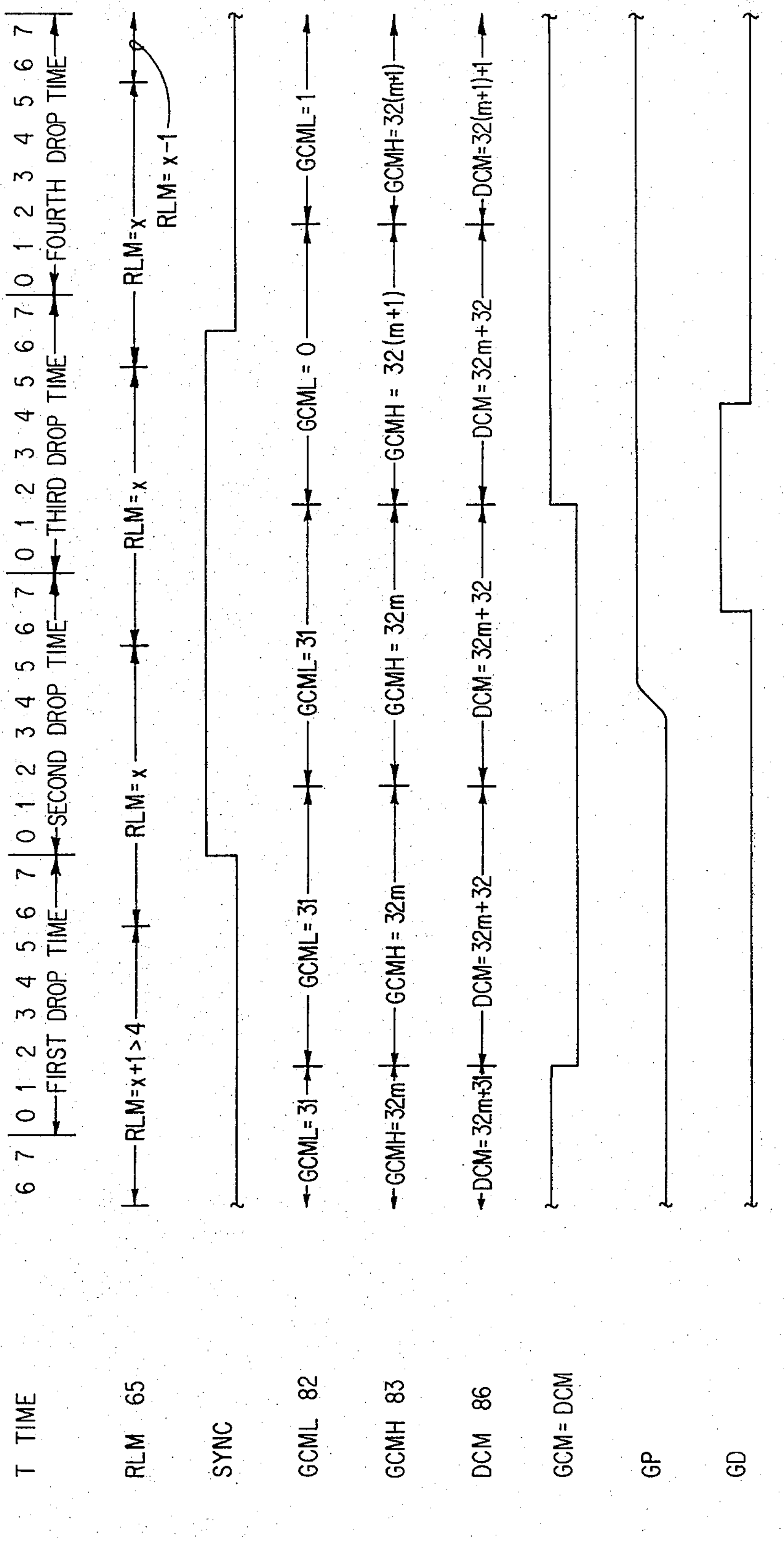

The sixteen-bit word from the PROS 50 is gated into the PCM 53 of the pointer counter 52 during the last drop time of the previous printed character. As shown in FIGS. 3A and 3B, each of the drop times is divided into eight equal segments of time consisting of T0, T1, T2, T3, T4, T5, T6, and T7 clock signals from a clock driven by the oscillator 19' (see FIG. 1). The output from the PROS 50 (see FIG. 2) is gated into the PCM 53 of the pointer counter 52 at the T2 clock signal (see FIG. 3A) during this last drop time of the previous printed character. In the ending drop times including the last drop time of the previous printed character, an end-of-character (EOC) latch 55 (see FIGS. 2 and 8) generates a high EOC signal from the time the T7 clock signal (see FIG. 3A) goes up until the next T4 clock signal goes up.

A GD latch 55' (see FIGS. 2 and 14) generates a high GD signal, which is up during the first part of the last drop time of a character. This is produced due to a high GP signal from the grating 15 (see FIG. 1).

Therefore, the gating logic for supplying the output of the PROS 50 (see FIG. 2) to the PCM 53 is defined by the logic equation $$PCM_n = PROS_n \cdot T2 \cdot EOC \cdot GD \tag{1}$$

In equation (1), n represents each bit of a specific sixteen-bit word stored in the PROS 50 so that each bit of the word from the PROS 50 is gated to the PCM 53 at the T2 clock signal when the EOC signal and the GD signal are high.

The PCM 53 transfers the count therein to the PCS 54 at the T5 clock signal of the same cycle. Furthermore, the count, which is transferred from the PCM 53 to the PCS 54 at the T5 clock signal is increased by one and transferred from the PCS 54 back to the PCM 53 at the T2 clock signal of the next drop time to increase the count of the PCM 53 by a binary count of one.

Accordingly, the following logic equations for the pointer counter 52 can be written:

$$\text{Set } PCM_n(\text{logical high}) = T2 \cdot EOC \cdot GD \cdot PROS_n + T2 \cdot (PCS_1 \cdot PCS_2 \cdot \cdots \cdot PCS_{n-1}) \cdot \overline{PCS_n} \cdot RLS = 0 \cdot \overline{EOC} \tag{2}$$

$$\text{Reset } PCM_n \text{ (logical low)} = T2 \cdot EOC \cdot GD \cdot \overline{PROS}_n + \tag{3}$$

-continued $$T2 \cdot (PCS_1 \cdot PCS_2 \cdot \cdots \cdot PCS_{n-1}) \cdot PCS_n \cdot RLS = 0 \cdot \overline{EOC}$$

$$\text{Set } PCS_n \text{ (logical high)} = T5 \cdot PCM_n \quad (4)$$

$$\text{Reset } PCS_n \text{ (logical low)} = T5 \cdot \overline{PCM_n} \quad (5)$$

In each of the logic equations (2), (3), (4), and (5) for the pointer counter 52, n=1, 2, 3, 4, 5, 6, 7, 8, 9, 10, 11, 12, 13, 14, 15, and 16 since there are sixteen bits. It should be understood that "." represents "and" and "+" represents "or."

Figures 4, 5:
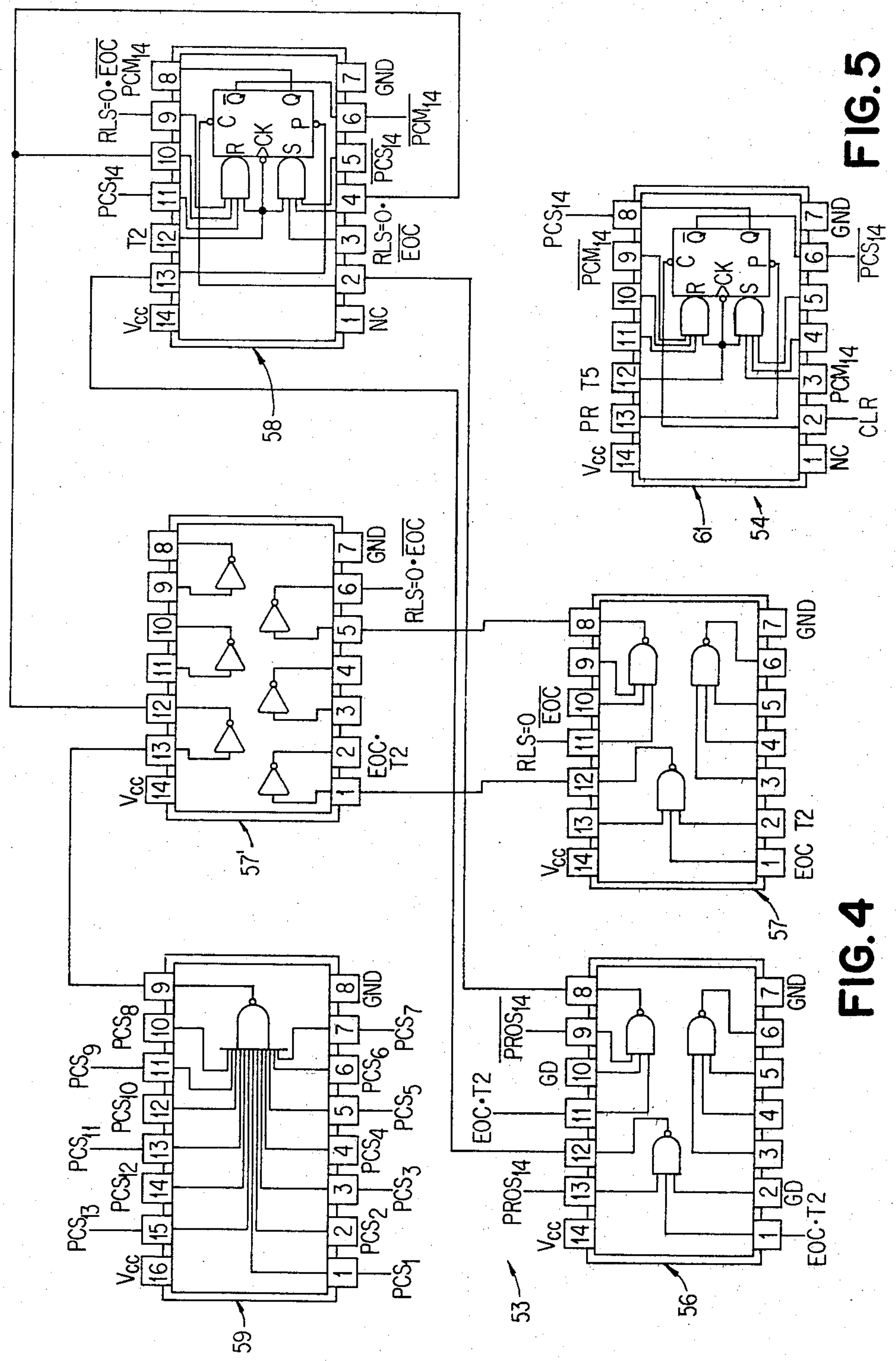
FIG. 4 is a schematic block diagram of a portion of a master pointer counter of a pointer counter of the control apparatus of the present invention.
FIG. 5 is a schematic block diagram of a portion of a slave pointer counter of the pointer counter of the control apparatus of the present invention.

One example of logic circuitry for forming the pointer counter 52 is shown in FIGS. 4 and 5 wherein the various logic elements of Texas Instruments are shown in FIG. 4 for the PCM 53 and wherein the single logic element of Texas Instruments for the PCS 54 is shown in FIG. 5. The elements in FIGS. 4 and 5 are for an example where n=14. It should be understood that the PCM 53 and the PCS 54 would have to include similar types of elements for each of the other bits from one to thirteen, fifteen, and sixteen, of the sixteen-bit word from the PROS 50 (see FIG. 2).

Referring to FIG. 4, the PCM 53 includes gate modules 56 and 57. Each of the gate modules 56 and 57 is a triple 3-input positive-nand gate sold by Texas Instruments as model SN7410 (J). It should be understood that each of the unused logic inputs of the gate modules 56 and 57 is held at a high logic level.

The gate module 57 has its pin 1 receiving the EOC signal from the EOC latch 55 (see FIGS. 2 and 8) and its pin 2 receiving the T2 clock signal. When each of these inputs is high, a low appears on pin 12 of the gate module 57 and is supplied to pin 1 of an inverter module 57'. One suitable example of the inverter module 57' is hex inverters sold by Texas Instruments as model SN7404 (J).

The gate module 56 has its pin 1 receiving the EOC.T2 signal from pin 2 of the inverter module 57', its pin 2 receiving the GD signal from the GD latch 55' (see FIGS. 2 and 14), and its pin 13 (see FIG. 4) receiving a PROS 14 signal (the fourteenth most significant bit of the sixteen-bit word and a logical high or low) from the PROS 50 (see FIG. 2). When these three inputs are all high, a low appears on pin 12 of the gate module 56 (see FIG. 4) and is supplied to PR input (pin 13) of a latch 58 sold Texas Instruments as an and-gated R-S master-slave flip-flop with preset and clear, model number SN74L71 (J). It should be understood that each of the unused logic inputs of the latch 58 is held at a high logic level.

When the pin 13 (PR input) of the latch 58 is low and pin 2 (CLR input) is high as will be explained hereinafter, the latch 58 supplies a high at its pin 8 (Q output), which is $PCM_{14}$ signal in the example given in which n=14. This satisfies one of the two portions of the logic equation (2) for setting the $PCM_{14}$ signal and sets the PCM 53 at a high for the fourteenth most significant bit of the sixteen-bit word from the PROS 50.

The PCM 53 of the pointer counter 52 also includes a gate 59, which is a 13-input positive-nand gate sold by Texas Instruments as model SN74S133 (J). The gate 59 has its pins 1-7 receiving $PCS_1$, $PCS_2$, $PCS_3$, $PCS_4$, $PCS_5$, $PCS_6$, and $PCS_7$signals, respectively, as inputs from the PCS 54 (see FIG. 2) for the first seven bits in the PCS 54 and its pins 10-15 (see FIG. 4) receiving $PCS_8$, $PCS_9$, $PCS_{10}$, $PCS_{11}$, $PCS_{12}$, and $PCS_{13}$ signals, respectively, as inputs from the PCS 54 (see FIG. 2) for the eighth to the thirteenth bits in the PCS 54. When all of these inputs are high to indicate that the status of $PCM_{14}$ should change at the next count, the gate 59 (see FIG. 4) has a low at its pin 9. The output signal from the pin 9 of the gate 59 is inverted by the inverter 57' and supplied to pins 4 and 10 of the latch 58.

The latch 58 has its pin 5 receive a $\overline{PCS_{14}}$ signal as an input from pin 6 ($\overline{Q}$ output) of a latch 61 (see FIG. 5), which is the same type part as the latch 58 (see FIG. 4) and has all of its unused logic inputs held at a high logic level. The T2 clock signal is supplied to pin 12 (CK input) of the latch 58.

The latch 58 has its pins 3 and 9 receive an $RLS=0\cdot\overline{EOC}$ signal from pin 6 of the inverter 57'. The $\overline{EOC}$ signal is supplied to pin 10 of the gate module 57 from the EOC latch 55 (see FIG. 8) and the RLS=0 signal is supplied to pin 11 of the gate module 57 from a run length counter 62 (see FIG. 6). Each of the RLS=0 signal and the $\overline{EOC}$ signal is high, as will be explained hereinafter, when one of the ink droplets 23 is to be printed.

When the inputs to both of the pins 10 and 11 of the gate module 57 (see FIG. 4) are high, then this input to each of the pins 3 and 9 of the latch 58 is high. Therefore, when the T2 clock signal has been high and goes low, the output from pin 12 of the inverter 57' is high, the $\overline{PCS_{14}}$ signal from pin 6 ($\overline{Q}$) output of the latch 61 (see FIG. 5) is high as will be explained hereinafter, and the $RLS=\cdot\overline{EOC}$ signal from pin 6 of the inverter module 57' (see FIG. 4) is high, the latch 58 will have a high $PCM_{14}$signal at its pin 8 (Q output). Thus, this satisfies the second portion of the logic equation (2) for setting $PCM_n$ where n=14. Therefore, this enables the PCM 53 of the pointer counter 52 to be set at the desired high for the fourteenth bit from either the PROS 50 (see FIG. 2) or to be upcounted by a count of one to a desired high from the PCS 54 after one of the droplets 23 to be printed has been produced.

The gate module 56 (see FIG. 4) also has the EOC·T2 signal received at its pin 11 and the GD signal from the GD latch 55' (see FIG. 14) received at its pin 10. The gate module 56 (see FIG. 4) has the $\overline{PROS_{14}}$ signal, which is high when the fourteenth-most significant bit of the sixteen-bit word from the PROS 50 (see FIG. 2) is a logical low, as the input to its pin 9.

Thus, when the inputs to the pins 9, 10, and 11 of the gate module 56 (see FIG. 4) are high, a low signal is produced at pin 8 of the gate module 56 and supplied to pin 2 (CLR input) of the latch 58. Since the pin 13 (PR input) of the latch 58 is high because the $PROS_{14}$ signal is low when the $\overline{PROS_{14}}$ signal is high, this low signal at the pin 2 (CLR input) of the latch 58 results in the latch 58 supplying a high $\overline{PCM_{14}}$ signal at its pin 6 ($\overline{Q}$ output) since n=14 in the example given. This satisfies one of the two portions of the logic equation (3) for resetting $PCM_{14}$ so that the PCM 53 has a low for the fourteenth-most significant bit of the sixteen-bit word from the PROS 50 (see FIG. 2).

The latch 58 (see FIG. 4) has its pin 11 receiving a $PCS_{14}$ signal from pin 8 (Q output) of the latch 61 (see FIG. 5). As previously mentioned, the latch 58 (see FIG. 4) has its pin 9 receiving the $RLS=0\cdot\overline{EOC}$ signal from the inverter 57'.

Therefore, when the T2 clock signal is high, the output from pin 12 of the inverter 57' is high, the $PCS_{14}$ signal from the pin 8 of the latch 61 (see FIG. 5) is high as will be explained hereinafter, and the $RLS=0\cdot\overline{EOC}$ signal is high, the latch 58 will have a high $\overline{PCM_{14}}$ signal at its pin 6 ($\overline{Q}$ output) after the T2 clock signal goes low. Thus, this satisfies the second portion of the logic equation (3) for resetting $PCM_n$ when n=14. Therefore, this logic enables the PCM 53 of the pointer counter 52 to be set at the desired low for the fourteenth bit either the PROS 50 (see FIG. 2) or to be upcounted to a low by a count of one from the PCS 54 after one of the droplets 23 to be printed has been produced.

The latch 61 (see FIG. 5), which is one of sixteen latches forming the PCS 54, has the T5 clock signal supplied to its pin 12 (CK input). The latch 61 has the $PCM_{14}$ signal from the pin 8 (Q output) of the latch 58 (see FIG. 4) supplied to its pin 3. Therefore, when the $PCM_{14}$ signal is high and the T5 clock signal is high, the latch 61 (see FIG. 5) will have a high $PCS_{14}$ signal at its pin 8 (Q output) after the T5 clock signal goes low. Thus, this satisfies the logic equation (4) for setting $PCS_{14}$ as a high when n=14. This enables the high PCM signal for the fourteenth-most significant bit in the PCM 53 to be transferred to the PCS 54 during the same drop time as when the signal was transferred to the PCM 53 from either the PROS 50 (see FIG. 2) or the PCS 54.

If the $\overline{PCM_{14}}$ signal is high, the latch 61 (see FIG. 5) will have a high $\overline{PCS_{14}}$ signal at its pin 6 ($\overline{Q}$ output) after the T5 clock signal goes low. This is because the $\overline{PCM_{14}}$ signal is supplied to pin 9 of the latch 61 from pin 6 ($\overline{Q}$ output) of the latch 58 (see FIG. 4).

This satisfies the logic equation (5) for resetting $PCS_n$ when n=14. This enables the PCS 54 (see FIG. 2) to be set at a desired low for the fourteenth-most significant bit when the fourteenth-most significant bit in the PCM 53 is low.

If n=16, it would be necessary to supply the $PCS_{13}$ signal to pin 3 of the gate module 56 (see FIG. 4), the $PCS_{14}$ signal to pin 4 of the gate module 56, and the $PCS_{15}$ signal to pin 5 of the gate module 56. When all of these signals were high, the gate module 56 would have a low on its pin 6, which would be supplied to pin 3 of the inverter module 57'. This results in a high at pin 4 of the inverter module 57' for supply to the pin 15, which receives the $PCS_{13}$ signal when n=14, of the gate 59.

If n=15, then there would be no input to the pin 5 of the gate module 56 for the $PCS_{15}$ signal. Instead, this would be held at a high logic level as are all unused logic inputs of each of the elements.

When n is less than 13, one or more of the inputs for the gate 59 of the PCM 53 do not have a signal supplied thereto. These unused logic inputs would be held at a high logic level.

It should be understood that the PCM 53 has fifteen additional circuits for each of the other fifteen bits similar to the circuit shown in FIG. 4. As previously mentioned, the PCS 54 has fifteen latches like the latch 61 for each of the other fifteen bits of the sixteen-bit word.

The sixteen-bit word output from the FROS 51 (see FIG. 2) has its first ten bits gated to a voltage register 64 and its last six bits gated at the same time to the run length counter 62. The run length counter 62 includes a master run length counter (RLM) 65 and a slave run length counter (RLS) 66 cooperating with each other. A new sixteen-bit word is supplied from the FROS 51 after charging of each of the droplets 23 to be printed.

The gating logic for gating the ten bits from the FROS 51 to the voltage register 64 is defined by the logic equation $$V_n = FROS_n \cdot T5 \cdot RLS = 0 \quad (6)$$

where n=1, 2, 3, 4, 5, 6, 7, 8, 9, or 10.

The gating logic from the FROS 51 to the run length counter 62 is defined by $$RLM_n = FROS_{n+10} \cdot T5 \cdot RLS = 0 \quad (7)$$

where n=1, 2, 3, 4, 5, or 6.

From the broad logic (7) for $RLM_n$, the following logic equations for the run length counter 62 can be written:

$$\text{Set } RLM_n = T5 \cdot RLS = 0 \cdot FROS_{n+10} + T5 \cdot RLS \neq 0 \cdot (\overline{RLS_1} \cdot \overline{RLS_2} \cdot \cdots \cdot \overline{RLS_{n-1}}) \cdot \overline{RLS_n} \quad (8)$$

$$\text{Reset } RLM_n = T5 \cdot RLS = 0 \cdot \overline{FROS_{n+10}} + T5 \cdot RLS \neq 0 \cdot (\overline{RLS_1} \cdot \overline{RLS_2} \cdot \cdots \cdot \overline{RLS_{n-1}}) \cdot RLS_n \quad (9)$$

$$\text{Set } RLS_n = T1 \cdot \overline{SYNC} \cdot RLM_n \quad (10)$$

$$\text{Reset } RLS_n = T1 \cdot \overline{SYNC} \cdot \overline{RLM_n} \quad (11)$$

$$RLS = 0 = \overline{RLS_1} \cdot \overline{RLS_2} \cdot \overline{RLS_3} \cdot \overline{RLS_4} \cdot \overline{RLS_5} \cdot \overline{RLS_6} \quad (12)$$

$$RLM = 0 = \overline{RLM_1} \cdot \overline{RLM_2} \cdot \overline{RLM_3} \cdot \overline{RLM_4} \cdot \overline{RLM_5} \cdot \overline{RLM_6} \quad (13)$$

$$RLM > 3 = RLM_3 + RLM_4 + RLM_5 + RLM_6 \quad (14)$$

In each of the foregoing logic equations (8) to (11) for the run length counter 62, n=1, 2, 3, 4, 5, or 6.

Figure 6:
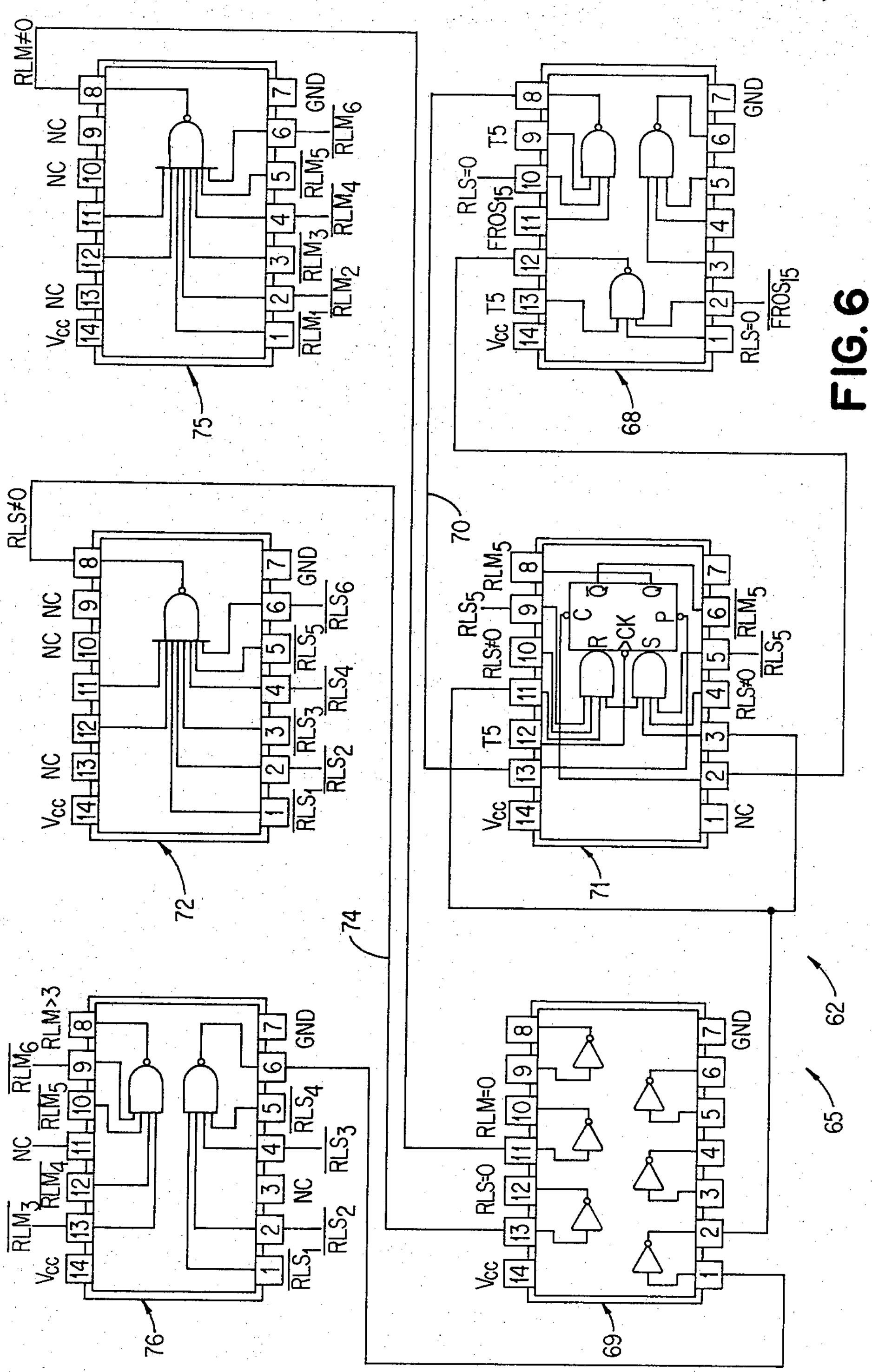
FIG. 6 is a schematic block diagram of a portion of a master run length counter of a run length counter of the control apparatus of the present invention.
Figure 7:
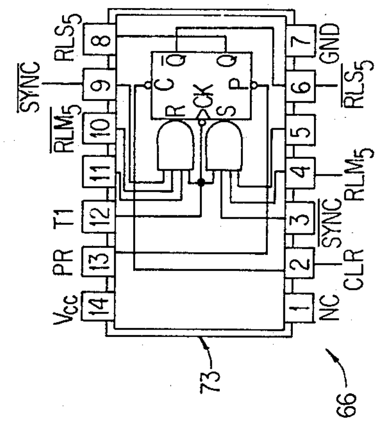
FIG. 7 is a schematic block diagram of a portion of a slave run length counter of the run length counter of the control apparatus of the present invention.

One example for forming the logic circuitry of the run length counter 62 is shown in FIGS. 6 and 7 wherein the various logic elements of Texas Instruments for the RLM 65 are shown in FIG. 6 and wherein the single logic element of Texas Instruments for the RLS 66 is shown in FIG. 7. The elements in FIGS. 6 and 7 are for an example where n=5. It should be understood that the RLM 65 and the RLS 66 would have to include similar types of elements for each of the other bits from one to six of the six bits supplied to the RLM 65 of the run length counter 62 from the FROS 51 (see FIG. 2).

Referring to FIG. 6, the RLM 65 of the run length counter 62 includes a gate module 68, which is preferably the same type part as the gate module 56 (see FIG. 4). It should be understood that each of the unused logic inputs of the gate module 68 (see FIG. 6) is held at a high logic level.

The gate module 68 has its pin 9 receiving the T5 clock signal, its pin 11 receiving an $FROS_{15}$ signal (the fifteenth bit of the sixteen-bit word) from the FROS 51 (see FIG. 2) with the $FROS_{15}$ signal being a logical high or low depending on whether the fifteenth bit is a logical high or low, and its pin 10 (see FIG. 6) receiving the RLS=0 signal from pin 12 of an inverter module 69, which is the same type part as the inverter module 57' (see FIG. 4). When these three inputs are all high, a low signal appears on output pin 8 of the gate module 68 (see FIG. 6) and is supplied through a lead 70 to pin 13 (PR input) of a latch 71, which is the same type part as the latch 58 (see FIG. 4). It should be understood that all of the unused logic inputs to the latch 71 (see FIG. 6) are held at a high logic level.

When the pin 13 (PR input) of the latch 71 is low and a high is at pin 2 (CLR input) of the latch 71 as will be explained hereinafter, the latch 71 supplies a high $RLM_5$ signal at its pin 8 (Q output) since n=5 in the example given. This satisfies one of the two portions of the logic equation (8) for setting the $RLM_5$ signal and sets it at a high when the fifteenth bit in the output of the FROS 51 (see FIG. 2) is high.

The RLS=0 signal, which is supplied from the pin 12 of the inverter module 69 (see FIG. 6), is produced from a gate module 72, which is an 8 -input positive-nand gates sold by Texas Instruments as model SN7430 (J). Each of the unused logic inputs of the gate module 72 is held at a high logic level. It should be understood that only one of the gate modules 72 is required for the RLM 65 rather than one for each bit.

The gate module 72 has its pins 1-6 receiving $\overline{RLS_1}$, $\overline{RLS_2}$, $\overline{RLS_4}$, $\overline{RLS_5}$, and $\overline{RLS_6}$ signals, respectively, as inputs. Each of these inputs is supplied from a corresponding latch of the RLS 66 (see FIG. 7). Thus, as shown in FIG. 7, the RLS 66 has a latch 73, which is the same type part as the latch 58 (see FIG. 4) and has all of its unused logic inputs held at a high logic level, supplying the $\overline{RLS_5}$ signal at its pin 6 ($\overline{Q}$ output) When each of the inputs to pins 1-6 of the gate module 72 (see FIG. 6) is high, pin 8 of the gate module 72 supplies a low RLS≠0 signal. This is connected through a lead 74 to pin 13 of the inverter module 69. Thus, this becomes a high RLS=0 signal at pin 12 of the inverter module 69 to indicate that the RLS 66 is at a count of zero and satisfies the logic equation (12).

The inverter module 69 has an RLM=0 signal at its pin 10. This is produced by the inverter module 69 inverting an RLM≠0 signal at its pin 11 from pin 8 of a gate module 75, which is the same type part as the gate module 72 and has each of its unused logic inputs held at a high logic level. It should be understood that only one of the gate modules 75 is required for the RLM 65 rather than one for each bit.

The gate module 75 has its pins 1, 2, 3, 4, 5, and 6 receive $\overline{RLM_1}$, $\overline{RLM_2}$, $\overline{RLM_3}$, $\overline{RLM_4}$, $\overline{RLM_5}$, and $\overline{RLM_6}$ signals, respectively, as inputs. These inputs are supplied from the latch 71 (the $\overline{RLM_5}$ signal) and a corresponding latch of the other five bits. When each of the inputs to the pins 1-6 of the gate module 75 is high, the gate module 75 supplies a low RLM≠0 signal at its pin 8. This satisfies the logic equation (13).

The RLS≠0 signal at the pin 8 of the gate module 72 is part of the second portion of the logic equation (8) for setting $RLM_n$. It is supplied to pin 4 of the latch 71. The latch 71 has its pin 5 receive the $\overline{RLS_5}$ signal from the latch 73 (see FIG. 7) of the RLS 66.

The latch 71 (see FIG. 6) has its pin 3 receiving the inverted output of pin 6 of a gate module 76, which is a dual 4-input positive-nand gates sold by Texas Instruments as model SN7420 (J). The gate module 76 has all of its unused logic inputs held at a high logic level.

The gate module 76 has its input pins 1, 2, 4, and 5 receive the $\overline{RLS_1}$, $\overline{RLS_2}$, $\overline{RLS_3}$, and $\overline{RLS_4}$ signals, respectively, from latches in the RLS 66 for n=1, 2, 3, and 4 and corresponding to the latch 73 (see FIG. 7). Thus, when all these signals are high, pin 6 of the gate module 76 (see FIG. 6) has a low as its output. The gate module 76 has its pin 6 connected to pin 1 of the inverter module 69 so that pin 2 of the inverter module 69 goes high when the pin 6 of the gate module 76 is low.

Thus, when the latch 71 has a high at its input pin 3 because of each of the $\overline{RLS_1}$, $\overline{RLS_2}$, $\overline{RLS_3}$, and $\overline{RLS_4}$ signals being high, the RLS≠0 signal from the pin 8 of the gate module 72 is high, and the $\overline{RLS_5}$ signal is high, the latch 71 has an $RLM_5$ signal at its pin 8 (Q output) go high when the T5 clock signal has been high and goes low. This satisfies the second portion of the logic equation (8) for setting $RLM_n$ where n=5. Therefore, this enables the RLM 65 to be set to the desired high for the fifth bit to the RLM 65 from the FROS 51 (see FIG. 2) or the RLM 65 to be down counted by a count of one from the RLS 66 to the desired high after one of the droplets 23 is produced.

When the fifteenth bit (fifth bit to the RLM 65) of the signal from the FROS 51 is low, the first portion of the logic equation (9) for resetting $\overline{RLM_5}$ is used. That is, the latch 71 (see FIG. 6) produces a high $RLM_5$ signal at its pin 6 ($\overline{Q}$ output). This is accomplished through a low being supplied to pin 2 (CLR input) of the latch 71 from pin 12 of the gate module 68 when the latch 71 has a high at its pin 13 (PR input).

The gate module 68 has a low at its pin 12 only when the T5 clock signal at its pin 13 is high, the RLS=0 signal at its pin 1 is high, and $\overline{FROS_{15}}$ signal from the FROS 51 (see FIG. 51 (see FIG. 2) at its pin 2 is high. The $\overline{FROS}_{15}$ signal can be high only when the fifteenth bit from the FROS 51 is a logical zero. Therefore, at the time that the T5 clock signal goes high, a low is transmitted to the pin 2 (CLR input) of the latch 71 (see FIG. 6) to produce a high at its pin 6 ($\overline{Q}$ output). This satisfies one of the two portions of the logic equation (9) for resetting the $RLM_5$ signal and sets the RLM 65 at a low for the fifth bit of the six bits stored therein.

The latch 71 also produces a high $\overline{RLM}_5$ signal at its pin 6 ($\overline{Q}$ output) when the inputs to 9, 10, and 11 of the latch 71 are high and the T5 clock signal has been high and goes low. The latch 71 has a high at its pin 11 when each of $\overline{RLS_1}$, $\overline{RLS_2}$, $\overline{RLS_3}$, and $\overline{RLS_4}$ signals is high. The $RLS_5$ signal is supplied to pin 9 of the latch 71 from pin 8 (Q output) of the latch 73 (see FIG. 7) of the RLS 66.

The RLS≠0 signal is supplied to the pin 10 of the latch 71 (see FIG. 6) from the pin 8 of the gate module 72. This is high whenever at least one of the inputs to the gate module 72 is low.

Therefore, the second portion of the logic equation (9) for resetting the $RLM_n$ signal where n=5 is satisfied. This enables the RLM 65 of the run length counter 62 to be set at the desired low for the fifteenth bit (fifth bit in the RLM 65) from the FROS 51 (see FIG. 2) or to be downcounted by a count of one from the RLS 66 to the desired low at certain of the drop times.

Figure 9:
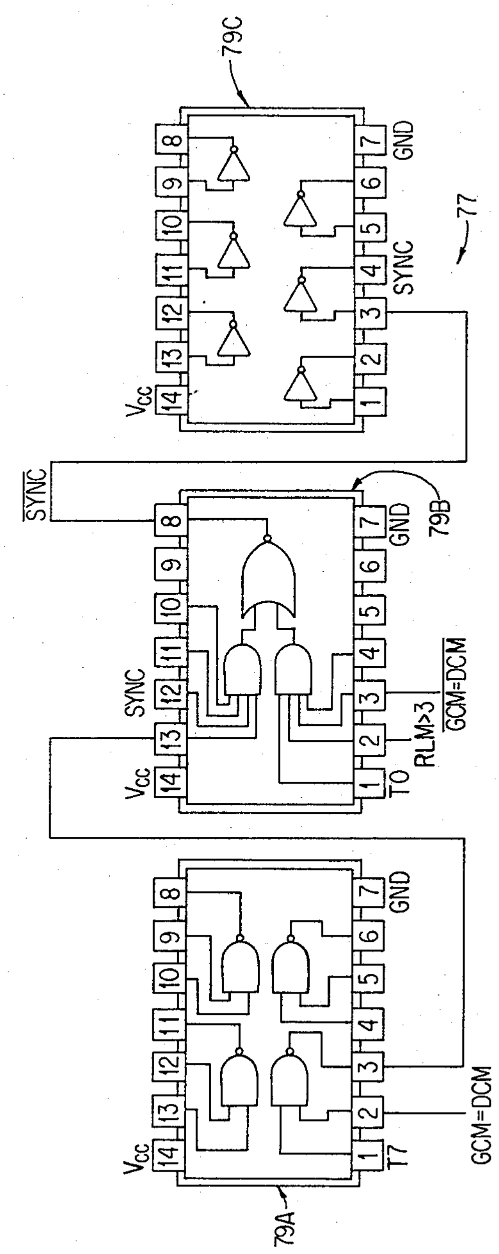
FIG. 9 is a schematic block diagram of a SYNC latch of the control apparatus of the present invention.

The latch 73 (see FIG. 7), which is one of the latches of the RLS 66, has the T1 clock signal supplied to its pin 12 (CK input). The latch 73 has the $RLM_5$ signal from the pin 8 (Q output) of the latch 71 (see FIG. 6) supplied to its pin 4 (see FIG. 7). A $\overline{SYNC}$ signal is supplied to pin 3 of the latch 73 from a SYNC latch 77 (see FIG. 9).

As will be explained hereinafter, the $\overline{SYNC}$ latch 77 produces a high SYNC signal when the count in a grating counter 78 (see FIG. 2) equals the count in a dot counter 79 and the T7 clock signal goes up. The dot counter 79 is a direct count of each of the droplets 23 while the grating counter 78 counts in a similar manner for each of the droplets 23 from a count of zero up to the count of thirty-one, at which point it is inhibited until a high GD pulse is supplied from the GD latch 55'. Each of the grating counter 78 and the dot counter 79 counts up in a binary fashion at the drop rate from zero when the initial GD pulse, which begins a character, is produced.

When the $\overline{SYNC}$ signal from the SYNC latch 77 (see FIG. 9) is high, the latch 73 (see FIG. 7) produces a high $RLS_5$ signal at its pin 8 (Q output) when the $T_1$ clock signal has been high and goes low and the $RLM_5$ signal is high. This satisfies the logic equation (10).

The latch 73 has the $\overline{SYNC}$ signal also supplied to its pin 9. The $\overline{RLM_5}$ signal from the pin 6 ($\overline{Q}$ output) of the latch 71 (see FIG. 6) is supplied to pin 10 of the latch 73 (see FIG. 7). Therefore, when the T1 clock signal at the pin 12 of the latch 73 has been high and goes low and the $\overline{SYNC}$ signal and the $\overline{RLM_5}$ signals are high, the latch 73 has a high $\overline{RLS_5}$ signal at its pin 6 (Q output). This satisfies the logic equation (11).

The RLM 65 (see FIG. 2) of the run length counter 62 is counted down a binary count of one at each occurrence of the T5 clock signal as long as the SYNC signal from the $\overline{SYNC}$ latch 77 (see FIG. 9) is up at the T1 clock signal of the same drop time. This is necessary to transfer the count in the RLM 65 (see FIG. 2) to the RLS 66 and satisfy one of the two logic equations (10) and (11). At least one of the six latches [the latch 73 (see FIG. 7) is one latch] of the RLS 66 changes state at each transfer of the count to the RLS 66 and is used to downcount the RLM 65.

The $\overline{SYNC}$ signal from the SYNC latch 77 (see FIG. 9) stays up until the counts in the grating counter 78 (see FIG. 2) and the dot counter 79 are not equal and the count in the RLM 65 of the run length counter 62 is greater than three. Accordingly, the following logic equations for the SYNC latch 77 (see FIG. 9) can be written:

Sync Set (SYNC is high)=(RLM>3)·TO·$\overline{GCM=DCM}$ (15)

Sync Reset ($\overline{SYNC}$ is high)=(GCM=DCM)·T7 (16)

The $\overline{SYNC}$ signal goes high when the T7 clock signal is high and a GCM signal from the grating counter 78 (see FIG. 2) is equal to a DCM signal from the dot counter 79. Accordingly, the SYNC latch 77 (see FIG. 9) has a GCM=DCM signal supplied to pin 2 of a gate module 79A, which has its unused logic inputs held at a high logic level, and the T7 clock signal supplied to pin 1 of the gate module 79A. One suitable example of the gate module 79A is a quadruple 2-input positive-nand gates sold as model SN7400 (J) by Texas Instruments.

When the signals to the pins 1 and 2 of the gate module 79A are high, a low appears at pin 3 of the gate module 79A and is supplied to pin 13 of a gate module 79B, which has its unused logic inputs held at a high logic level. One suitable example of the gate module 79B is a 2-wide 4-input and-or-invert gates sold by Texas Instruments as model SN74L55 (J).

The gate module 79B has a $\overline{SYNC}$ signal as its output at pin 8. The $\overline{SYNC}$ signal is supplied to pin 3 of the inverter module 79C, which inverts the $\overline{SYNC}$ signal to produce a SYNC signal at its pin 4. The inverter module 79C is the same type part as the inverter module 57' (see FIG. 4).

The gate module 79B (see FIG. 9) has its pin 12 receive the SYNC signal from the pin 4 of the inverter module 79C. Thus, when both of the T7 and GCM=DCM signals go high, the gate module 79B has a low input at its pin 13 so that its pin 8 has a high $\overline{SYNC}$ signal and the inverter module 79C has a low SYNC signal at its pin 4. The $\overline{SYNC}$ signal going high when the T7 clock signal and the GCM=DCM clock signal are high satisfies the logic equation (16).

The gate module 79B has the T0 clock signal supplied to its pin 1, the RLM>3 signal supplied to its pin 2, and the $\overline{GCM=DCM}$ signal supplied to its pin 3. The $\overline{SYNC}$ signal stays high until the T0 clock signal is high, the RLM>3 signal is high, and the $\overline{GCM=DCM}$ signal is high whereby the $\overline{SYNC}$ signal goes low so that the SYNC signal is high.

The RLM>3 signal is high only when the binary count in the RLM 65 (see FIG. 6) of the run length counter 62 is greater than three. The RLM>3 signal is produced at pin 8 of the gate module 76 of the RLM 65. For the count in the RLM 65 of the run length counter 62 to be greater than three, any of the bits greater than the $RLM_2$ signal will produce a count greater than three (e.g., the $RLM_3$ signal alone produces a count of four). Therefore, the gate module 76 has a $\overline{RLM_3}$ signal supplied to its pin 13, $\overline{RLM_4}$ signal supplied to its pin 12, $\overline{RLM_5}$ signal supplied to its pin 10, and $\overline{RLM_6}$ signal supplied to its pin 9. When any of these signals is low to indicate that the count of the RLM 65 of the run length counter 62 is greater than three, the RLM>3 signal on pin 8 of the gate module 76 is high.

The $\overline{GCM=DCM}$ signal is supplied from pin 9 of a gate 80 (see FIG. 10) of the dot counter 79 to pin 5 of an inverter module 81 of the dot counter 79. The gate 80 is the same type part as the gate 59 (see FIG. 4) of the PCM 53 for the pointer counter 52 and has all of its unused logic inputs held at a high logic level. The inverter module 81 (see FIG. 10) is the same type part as the inverter module 57' (see FIG. 4) of the PCM 53 of the pointer counter 52. The GCM=DCM signal is supplied from pin 6 of the inverter module 81 (see FIG. 10).

Accordingly, the $\overline{SYNC}$ signal from the SYNC latch 77 (see FIG. 9) enables down counting of the RLM 65 (see FIG. 2) of the run length counter 62 until the $\overline{GCM=DCM}$ signal from the pin 9 of the gate 80 (see FIG. 10) of the dot counter 79 goes high and the RLM>3 signal from the pin 8 of the gate module 76 (see FIG. 6) is high at that time. Therefore, counting of the run length counter 62 (see FIG. 2) is inhibited when the $\overline{SYNC}$ signal goes down until the GCM=DCM signal again goes high. This occurs only when the count in the grating counter 78 and the count in the dot counter 79 are again equal through the count in the grating counter 78 increasing while the dot counter 79 does not count through counting of the dot counter 79 being inhibited.

With the $\overline{SYNC}$ signal high, a high at each of the pins 1, 2, and 3 of the gate module 79B (see FIG. 9) because each of the T0 clock signal, the RLM>3 signal, and the $\overline{GCM=DCM}$ signal is high results in the $\overline{SYNC}$ signal at the pin 8 of the gate module 79B going low whereby the SYNC signal at the pin 4 of the inverter module 79C goes high. This satisfies the logic equation (15).

When the SYNC signal is high, the inputs to the pins 12 and 13 of the gate module 79B are high to hold the $\overline{SYNC}$ signal at a low logic level even though the T0 clock signal goes down. Thus, the $\overline{SYNC}$ signal stays down until the GCM=DCM signal again goes high and the T7 clock signal is high. At this time, the $\overline{SYNC}$ signal goes high and the SYNC signal goes low so that counting of the run length counter 62 (see FIG. 2) can again occur.

As an example, it will be assumed that there are at least 7680 drop times available per linear inch (3023.622 drop times per linear centimeter) of travel of the carrier 12 (see FIG. 1). If the grating 15 produces 240 grating pulses per inch (94.488 per centimeter) of grating, then there would be a minimum of thirty-two (7680/240) drop times between grating pulses from the grating 15. In order to guarantee a minimum of thirty-two of the droplets 23 between grating pulses, the velocity of the carrier 12 must be controlled so that at least this minimum number of the droplets 23 is produced between grating pulses. Thus, during printing of a character, additional drop times will be accumulated. These must be disposed of without affecting the placement of the nearby droplets 23 and without creating noticeable horizontal location errors.

Therefore, the grating counter 78 (see FIG. 2) includes a low master grating counter (GCML) 82, which counts from zero to thirty-one (thirty-one of the droplets 23) and a high master grating counter (GCMH) 83, which counts once for each time that the GCML 82 is reset from thirty-one to zero (thirty-two of the droplets 23). The grating counter 78 also includes a low slave grating counter (GCSL) 84, which counts the same as the GCML 82, and a high slave grating counter (GCSH) 85, which counts the same as the GCMH 83.

The dot counter 79 includes a master dot counter (DCM) 86 and a slave dot counter (DCS) 87. As previously mentioned, the dot counter 79 counts each of the droplets 23 except when the dot counter 79 is inhibited when the SYNC signal from the SYNC latch 77 goes up.

The following logic equations for the GCML 82 and the GCSL 84 of the grating counter 78 can be written where n=1, 2, 3, 4, or 5 as each of the GCML 82 and the GCSL 84 contains only five bits:

$$\text{Set } GCML_n = T1(GCSL_1 \cdot GCSL_2 \cdot \text{- - -} \cdot GCSL_{n-1}) \cdot \overline{GCSL_n} \quad (17)$$

$$\text{Set } GCML_n = T1 \cdot (GCSL_1 \cdot GCSL_2 \cdot \text{---} \cdot GCSL_{n-1}) \cdot \overline{GCSL_n} \quad (17)$$

$$\text{Reset } GCML_n \ (\overline{GCML_n} \text{ is set at a logical high}) = GD \cdot T2 + T1 \cdot (GCSL_1 \cdot GCSL_2 \cdot \text{---} \cdot GCSL_{n-1}) \cdot GCSL_n \cdot GCSL \neq 31 + EOC \cdot T2 \quad (18)$$

$$\text{Set } GCSL_n = T5 \cdot GCML_n \quad (19)$$

$$\text{Reset } GCSL_n \ (\overline{GCSL_n} \text{ is set at a logical high}) = T5 \cdot \overline{GCML_n} \quad (20)$$

$$GCSL = 31 = GCSL_1 \cdot GCSL_2 \cdot GCSL_3 \cdot GCSL_4 \cdot GCSL_5 \quad (21)$$

It should be understood that the second portion of logic equation (18) is not applicable where n=5 since only the first and third portions of logic equation (18) are required.

The following logic equations for the GCMH 83 and the GCSH 85 of the grating counter 78 can be written where n=6, 7, 8, 9, or 10 as each of the GCMH 83 and the GCSH 85 contains only five bits:

$$\text{Set } GCMH_n = (T1 \cdot GD \cdot GCSL = 31) \cdot (GCSH_6 \cdot GCSH_7 \cdot \text{---} \cdot GCSH_{n-1}) \cdot \overline{GCSH_n} \quad (22)$$

$$\text{Reset } GCMH_n \ (\overline{GCMH_n} \text{ is set at a logical high}) = T2 \cdot EOC + (T1 \cdot GD \cdot GCSL = 31) \cdot (GCSH_6 \cdot GCSH_7 \cdot \text{---} \cdot GCSH_{n-1}) \cdot GCSH_n \quad (23)$$

-continued $$\text{Set } GCSH_n = T5 \cdot GCMH_n \quad (24)$$

$$\text{Reset } GCSH_n \ (\overline{GCSH_n} \text{ is set at a logical high}) = T5 \cdot \overline{GCMH_n} \quad (25)$$

Figure 10:
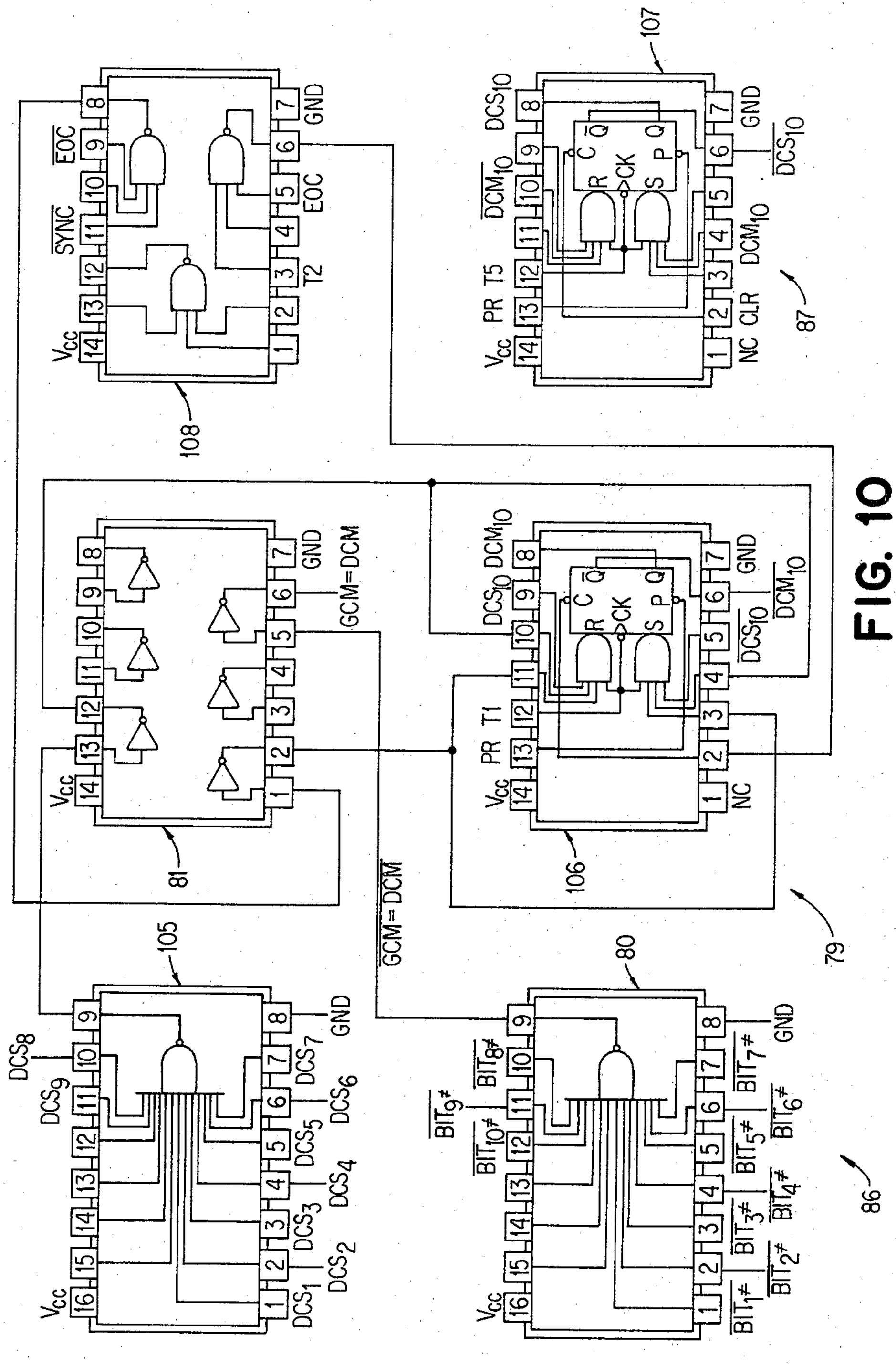
FIG. 10 is a schematic block diagram of a portion of a dot count register of the control apparatus of the present invention.
Figures 10A, 11:
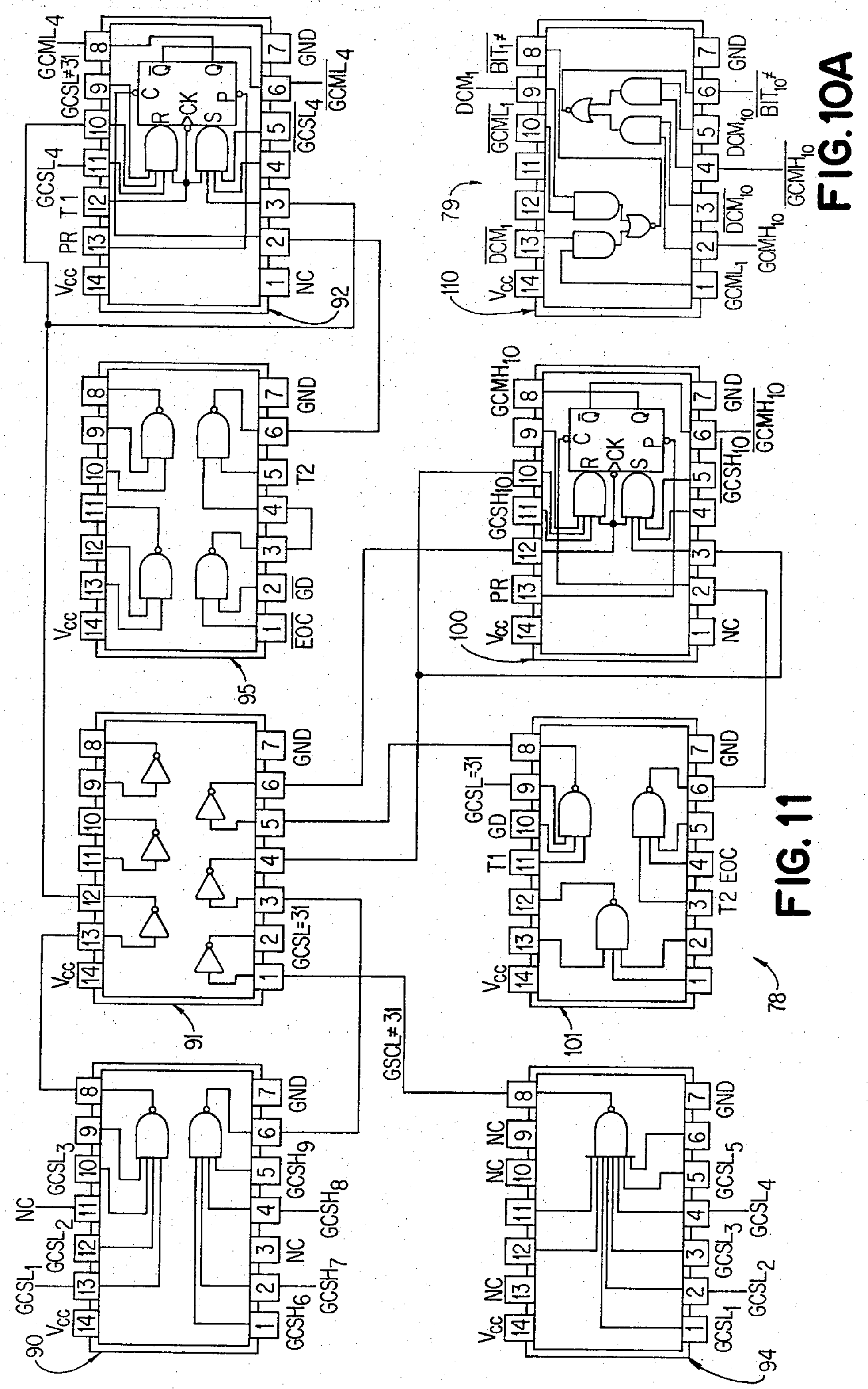
FIG. 10A is a schematic block diagram of another portion of the dot count register of the control apparatus of the present invention.
FIG. 11 is a schematic block diagram of a portion of a master grating counter of a grating counter of the control apparatus of the present invention.
Figures 12, 13, 14:
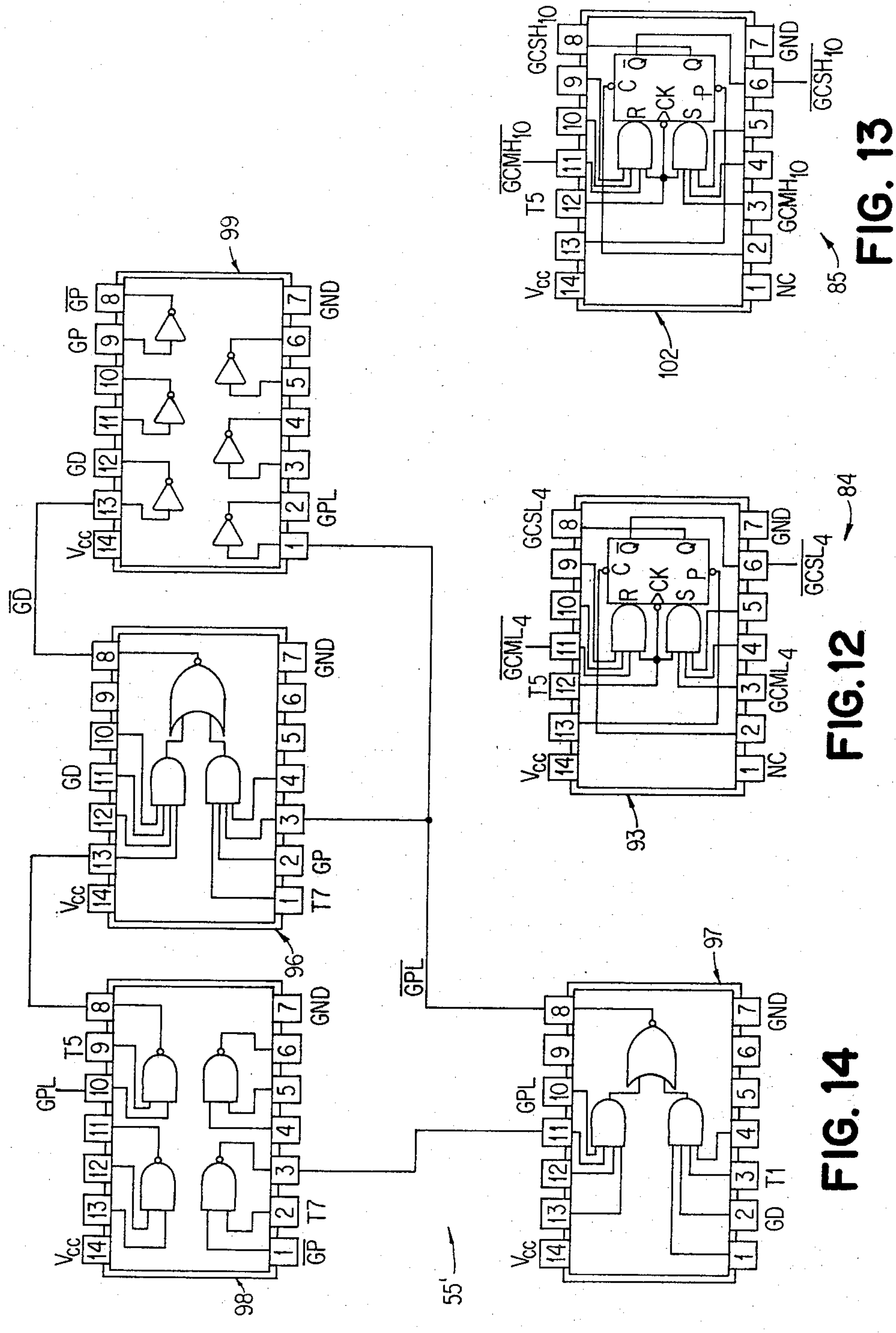
FIG. 12 is a schematic block diagram of a portion of a low slave grating counter of the grating counter of the control apparatus of the present invention.
FIG. 13 is a schematic block diagram of a portion of a high slave grating counter of the grating counter of the control apparatus of the present invention.
FIG. 14 is a schematic block diagram of a grating detector latch pair of the control apparatus of the present invention.

One example of circuitry for forming the grating counter 78 is shown in FIGS. 11–13 wherein the various logic elements of Texas Instruments for the GCML 82 and the GCMH 83 are shown in FIG. 11, the single logic element of Texas Instruments for the GCSL 84 is shown in FIG. 12, and the single logic element of Texas Instruments for the GCSH 85 is shown in FIG. 13. The elements in FIG. 11 for the GCML 82 are an example where n=4 and for the GCMH 83 are for an example where n=10. In FIG. 12, the elements are for an example where n=4 for the GCSL 84, and in FIG. 13, the elements are for an example where n=10 for the GCSH 85. It should be understood that each of the GCML 82 and the GCMH 83 would have to include similar types of elements for each of the first, second, third, and fifth bits and each of the GCSL 84 and the GCSH 85 would have to include similar types of elements for each of the sixth through ninth bits.

Referring to FIG. 11, the grating counter 78 includes a gate module 90, which is the same type part as the gate module 76 (see FIG. 6) and has all of its unused logic inputs held at a high logic level. The gate module 90 (see FIG. 11) has a $GCSL_1$ signal supplied to its pin 13, a $GCSL_2$ signal supplied to its pin 12, and a $GCSL_3$ signal supplied to its pin 10. Each of these signals is supplied from the GCSL 84 (see FIGS. 2 and 12).

When all of these three input signals are high, the gate module 90 (see FIG. 11) has a low at its pin 8, which is supplied to pin 13 of an inverter module 91. The inverter module 91 is the same type part as the inverter module 57' (see FIG. 4).

The inverter module 91 (see FIG. 11) inverts the low input at its pin 13 to a high output at its pin 12. The output of the pin 12 of the inverter module 91 is supplied to pins 3 and 10 of a latch 92, which is the same type part as the latch 58 (see FIG. 4) and has all of its unused logic inputs held at a high logic level.

The latch 92 (see FIG. 11) has a $\overline{GCLS_4}$ signal supplied to its pin 5 from a pin 6 (Q output) of a latch 93 (see FIG. 12) of the GCSL 84. The $\overline{GCSL_4}$ signal goes high when the fourth bit in the GCML 82 (see FIG. 11) is a logical zero ($\overline{GCML_4}$ at pin 6 of the latch 92 is high) at the time of the T5 clock signal.

The latch 93 (see FIG. 12) has the T5 clock signal supplied to its pin 12 (CK input) and the $\overline{GCML_4}$ signal from the pin 6 ($\overline{Q}$ output) of the latch 92 (see FIG. 11) supplied to its pin 11. Thus, if the $\overline{GCML_4}$ signal is high when the T5 clock signal has been high and goes low, the latch 93 (see FIG. 12) has a high $\overline{GCSL_4}$ signal at its pin 6 ($\overline{Q}$ output).

Therefore, when the T1 clock signal at the pin 12 (CK input) of the latch 92 (see FIG. 11) has been high and goes low and the $\overline{GCSL_4}$ signal and the input to the pin 3 of the latch 92 are high, the latch 92 has a high $GCML_4$ signal at its pin 8 (Q input). This advances the binary count in the GCML 82 by a count of one. This satisfies the logic equation (17).

The latch 92 has its pin 11 receive a $GCSL_4$ signal from pin 8 (Q output) of the latch 93 (see FIG. 12) of the GCSL 84. When the $GCML_4$ signal supplied to pin 3 of the latch 93 from pin 8 (Q output) of the latch 92 (see FIG. 11) is high and the T5 clock signal at the pin 12

(CK input) of the latch 93 (see FIG. 12) has been high and goes low, the $GCSL_4$ signal goes high.

The latch 92 (see FIG. 11) has its pin 9 receive a GCSL≠31 signal. This signal is high except when the count of the GCSL 84 (see FIG. 2) is at thirty-one. Accordingly, when the T1 clock signal has been high and goes low and the $GCSL_4$ signal is high, the signal at pin 10 of the latch 92 (see FIG. 11) is high, and the GCSL≠31 signal is high, the latch 92 will have a high $\overline{GCML_4}$ signal at its pin 6 ($\overline{Q}$ output). This is a logical zero at the fourth bit location in the GCML 82 (see FIG. 2). This satisfies the second portion of the logic equation (18).

The GCSL≠31 signal is supplied from pin 8 of a gate module 94 (see FIG. 11), which is the same type part as the gate module 72 (see FIG. 6) and has all of its unused logic inputs held at a high logic level. The gate module 94 (see FIG. 11) has its pins 1-5 receive $GCSL_1$, $GCSL_2$, $GCSL_3$, $GCSL_4$, and $GCSL_5$ signals, respectively. Therefore, the gate 94 has a high at its pin 8 except when all five inputs are high, and this can occur only when the GCSL 84 (see FIGS. 2 and 12) has counted thirty-one times (i.e., from zero to thirty-one) so that all five bit locations in the GCSL 84 are high. This is exemplified by the high $GCSL_4$ signal at pin 8 of the latch 93 (see FIG. 12).

The latch 92 (see FIG. 11) has the $\overline{GCML_4}$ signal at its pin 6 ($\overline{Q}$ output) also go high when a low input is received at its pin 2 (CLR input) since its pin 13 (PR input) is always high. The pin 2 (CLR input) of the latch 92 is connected to pin 6 of a gate module 95, which is the same type part as the gate module 79A (see FIG. 9). It should be understood that only one of the gate modules 95 (see FIG. 11) is required for all of the latches (the latch 92 is for n=4) for the five bits of the GCML 82. The gate module 95 has a low signal on its pin 6 when the T2 clock signal at its pin 5 and a signal at its pin 4 are both high.

The input pin 4 of the gate module 95 is connected to output pin 3 of the gate module 95. The pin 3 of the gate module 95 has a high output whenever the inputs to both pins 1 and 2 of the gate module 95 are not high.

Figure 8:
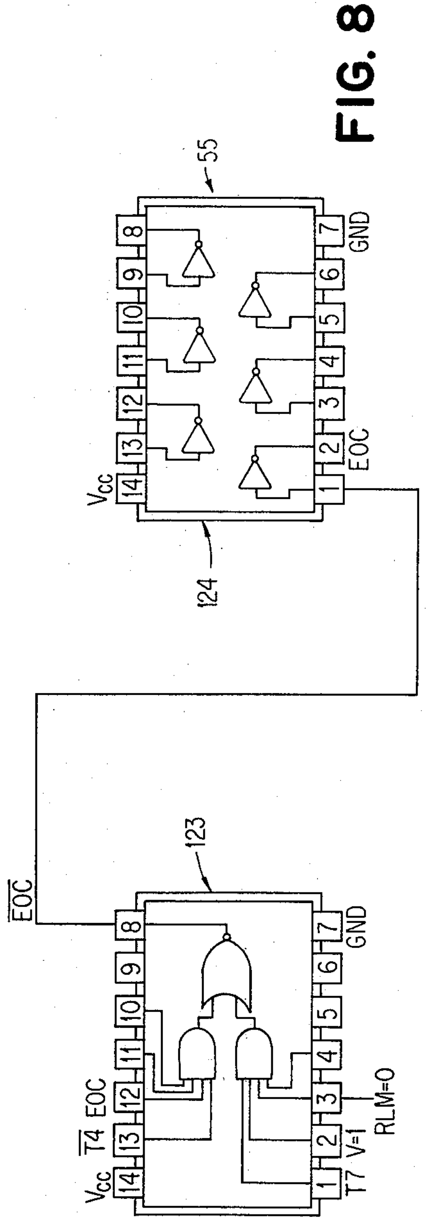
FIG. 8 is a schematic block diagram of an end-of-character latch of the control apparatus of the present invention.

The pin 1 of the gate module 95 receives an $\overline{EOC}$ signal from the EOC latch 55 (see FIGS. 2 and 8). The $\overline{GD}$ signal is supplied to pin 2 of the gate module 95 (FIG. 11) from the GD latch 55' (see FIGS. 2 and 14). The GD latch 55' is designed to satisfy the two following logic equations:

$$\text{Set } GD = GP \cdot T7 \cdot \overline{GPL} \quad (26)$$

$$\text{Reset } GD = T5 \cdot GPL \quad (27)$$

As shown in FIG. 14, the GD latch 55' includes gate modules 96, 97, and 98 and an inverter module 99. Each of the gate modules 96 and 97 is the same type part as the gate module 79B (see FIG. 9) of the SYNC latch 77 and has its unused logic inputs held at a high logic level. The gate module 98 (see FIG. 14) is the same type part as the gate module 79A (see FIG. 9) of the SYNC latch 77 and has its unused logic inputs held at a high logic level. The inverter module 99 (see FIG. 14) is the same type part as the inverter module 57' (see FIG. 4).

The gate module 96 (see FIG. 14) has its input pin 2 receiving a GP signal from the grating 15 (see FIG. 1). The GP signal goes high each time that one of the lines of the grating 15 is detected by the circuitry of the grating 15.

The gate module 96 (see FIG. 14) has its pin 3 receiving a $\overline{GPL}$ signal from pin 8 of the gate module 97. When the GP signal goes up, the $\overline{GPL}$ signal is high.

The gate module 96 (see FIG. 14) has its pin 1 receiving the T7 clock signal. Thus, when the T7 clock signal goes high after the GP signal and the $\overline{GPL}$ signal are high, the gate module 96 has a low $\overline{GD}$ signal at its pin 8, which is connected to pin 13 of the inverter module 99.

Accordingly, the low $\overline{GD}$ signal at pin 13 of the inverter module 99 is inverted to a high GD signal at pin 12 of the inverter module 99. This satisfies the logic equation (26).

The GD signal at the pin 12 of the inverter module 99 is supplied to pin 11 of the gate module 96 and to pin 2 of the gate module 97. As long as pin 13 of the gate module 96 has a high input, the GD signal at the pin 12 of the inverter module 99 will stay up even after the T7 clock signal goes down.

The pin 13 of the gate module 96 is connected to output pin 8 of the gate module 98. The gate module 98 has the T5 clock signal supplied to its pin 9 and a GPL signal supplied to its pin 10 from pin 2 of the inverter module 99.

At the time that the GD signal goes high, the GPL signal from the pin 2 of the inverter module 99 is low. Since the T5 clock signal also is low at this time, the input to the pin 13 of the gate module 96 is high so that the GD signal at the pin 12 of the inverter module 99 stays up after the T7 clock signal goes down.

With the GD signal high, the next occurrence of the T1 clock signal, which is supplied to pin 3 of the gate module 97, going high produces a low $\overline{GPL}$ signal at pin 8 of the gate module 97. The pin 8 of the gate module 97 is connected to pin 1 of the inverter module 99 so that a low $\overline{GPL}$ signal produces a high GPL signal at the pin 2 of the inverter module 99. As previously mentioned, the pin 8 of the gate module 97 also is connected to the pin 3 of the gate module 96.

Therefore, with the GPL signal going high from the T1 clock signal going high after the GD signal went up, the next T5 clock signal at the pin 9 of the gate module 98 produces a low at the pin 8 of the gate module 98. As a result, the input to the pin 13 of the gate module 96 goes low so that the pin 8 of the gate module 96 has a high $\overline{GD}$ signal. This results in the GD signal at the pin 12 of the inverter module 99 going down. Thus, this satisfies the logic equation (27).

The GPL signal is supplied to pin 10 of the gate module 97, which has its pin 11 connected to pin 3 of the gate module 98. Thus, if the input to the pin 11 of the gate module 97 is high with the GPL signal being high, the GPL signal will stay high after the T1 clock signal goes down.

The pin 3 of the gate module 98 is high except when the inputs to both pins 1 and 2 of the gate module 98 are high. The gate module 98 has its pin 1 receive a $\overline{GP}$ signal from pin 8 of the inverter module 99, which has the GP signal supplied to its pin 9. The gate module 98 receives the T7 clock signal at its pin 2.

Therefore, as long as the grating 15 (see FIG. 1) is producing a high GP signal, the $\overline{GP}$ signal at the pin 1 of the gate module 98 (see FIG. 14) stays low to maintain a high at the pin 3 of the gate module 98. Thus, the GPL signal stays high as long as the grating 15 (see FIG. 1) is producing a high GP signal.

It should be understood that the GP signal from the grating 15 stays high for at least three drop times. As previously mentioned, there are at least thirty-two drop times between the start of two adjacent GP signals.

When the GP signal goes down, the $\overline{GP}$ signal at the pin 1 of the gate module 98 (see FIG. 14) goes high. When the T7 clock signal next goes up, the inputs to both of the pins 1 and 2 of the gate module 98 are high to produce a low at the pin 11 of the gate module 97. This results in the $\overline{GPL}$ signal going up to cause the GPL signal to go low. Therefore, the GPL signal stays up for as long as the GP signal and then goes down when the next T7 clock signal goes up. Thus, the $\overline{GPL}$ signal is high when the GP signal next goes up.

Accordingly, the first portion of the logic equation (18) is satisfied when the GD signal is high to indicate one of the grating pulses has been produced by the grating 15 (see FIG. 1) and the T2 clock signal goes high. At this time, the latch 92 (see FIG. 11) and each of the corresponding latches for each of the other four bits of the GCML 82 are set at zero to start to count again in the GCML 82. Thus, the first portion of the logic equation (18) is when counting again begins in the GCML 82.

As previously mentioned, the pin 1 of the gate module 95 (see FIG. 11) receives the $\overline{EOC}$ signal from the EOC latch 55 (see FIGS. 2 and 8). The $\overline{EOC}$ signal goes low at the completion of printing a character as will be hereinafter explained. The low $\overline{EOC}$ signal causes all of the latches in the GCML 82 to be set at zero when the T2 clock signal goes high. This satisfies the third portion of the logic equation (18).

As previously mentioned, only the first and third portions of the logic equation (18) are required for n=5. This is because the GCML 82 of the grating counter 78 (see FIG. 2) counts without wrap, that is, it counts from zero to thirty-one and then stops unit it is set to zero by the occurrence of a high EOC signal or a high GD signal. Therefore, the second portion of the logic equation (18) is not necessary where n=5 because the $GCML_5$ signal needs only to be high in order to reach the count of thirty-one. Accordingly, the pins 9, 10, and 11 of the latch 92 (see FIG. 11) for n=5 would not be used and would be held at a high logic level.

The $GCSL_4$ signal at the pin 8 (Q output) of the latch 93 (see FIG. 12) of the GCSL 84 goes high when the $GCML_4$ is high and the T5 clock signal goes low after being high. This is accomplished through supplying the $GSML_4$ signal to pin 3 of the latch 93 and the T5 clock signal to pin 12 (CK input) of the latch 93.

If the $\overline{GCML_4}$ signal was high rather than the $GCML_4$ signal being high, then the $\overline{GCSL_4}$ signal at pin 6 ($\overline{Q}$ output) of the latch 93 goes high at the T5 clock signal going low after being high. These satisfy the logic equations (19) and (20) in that the GCSL 84 (see FIG. 2) is set to the same count as in the GCML 82 at the T5 clock signal after the GCML 82 had been upcounted by the count of one at the T1 clock signal.

The GCMH 83 is advanced by a count of one after each time that the GCML 82 has counted to thirty-one. Therefore, for n=10, a latch 100 (see FIG. 11) supplies a $GCMH_{10}$ signal at its pin 8 (Q output) and a $\overline{GCMH_{10}}$ signal at its pin 6 ($\overline{Q}$ output). The latch 100, which is the same type part as the latch 58 (see FIG. 4) and has all of its unused logic inputs held at a high logic level, has its pin 12 (CK input) receive a T1·GD·GCSL=31 signal from the pin 6 of the inverter module 91 (see FIG. 11). This signal can be high only when each of the T1 clock signal, the GD signal, and the GCSL=31 signal is high.

A gate module 101, which is the same type part as the gate module 56 (see FIG. 4) and has all of its unused logic inputs held at a high logic level, has its pins 9 (see FIG. 11), 10, and 11 receive the GCSL=31 signal, the GD signal, and the T1 clock signal, respectively. When all three of these input signals are high, the gate module 101 has a low at its pin 8. The pin 8 of the gate module 101 is connected to pin 5 of the inverter module 91 whereby the low at the pin 8 is converted to a high at the pin 6 of the inverter module 91 and applied to the pin 12 of the latch 100 as the T1·GD·GCSL=31 signal.

The gate module 90 has its pins 1, 2, 4, and 5 receive a $GCSH_6$ signal, a $GCSH_7$ signal, a $GCSH_8$ signal, and $GCSH_9$ signal, respectively, from latches corresponding to a latch 102 (see FIG. 13). When all of these signals are high, the gate module 90 (see FIG. 11) supplies a low from its pin 6 to pin 3 of the inverter module 91, which inverts the signal to produce a high at its pin 4 for supply to each of pins 3 and 10 of the latch 100.

The latch 100 has its pin 5 receive a $\overline{GCSH_{10}}$ signal from pin 6 ($\overline{Q}$ output) of the latch 102 (see FIG. 13) of the GCSH 85. The latch 102 is the same type part as the latch 58 (see FIG. 4) and has all of its unused logic inputs held at a high logic level.

Therefore, when the inputs to pins 3 and 5 of the latch 100 (see FIG. 11) are high and the input to the pin 12 of the latch 100 has been high and goes low, the latch 100 has a high $GCMH_{10}$ signal at its pin 8 (Q output). This results in upcounting the GCMH 83 by a count of one. This satisfies the logic equation (22) for n=6, 7, 8, 9, or 10.

The latch 100 has its pin 11 receive a $GCSH_{10}$ signal from pin 8 (Q output) of the latch 102 (see FIG. 13) of the GCSH 85. When the $GCSH_{10}$ signal is high, the pin 10 of the latch 100 is high, and the pin 12 has been high and goes low due to the T1 clock signal going low after being up, the latch 100 has a high $\overline{GCMH_{10}}$ signal at its pin 6 ($\overline{Q}$ output).

The $GCSH_{10}$ signal at pin 8 (Q output) of the latch 102 (see FIG. 13) of the GCSH 85 is high when the T5 clock signal has been high and goes low and the $GCMH_{10}$ signal is high. The $\overline{GCSH_{10}}$ signal at pin 6 ($\overline{Q}$ output) of the latch 102 of the GCSH 85 is high when the T5 clock signal has been high and goes low and the $\overline{GCMH_{10}}$ signal is high. These satisfy the logic equations (24) and (25) for n=6, 7, 8, 9, or 10.

Additionally, the latch 100 (see FIG. 11) has its pin 2 (CLR input) connected to pin 6 of the gate module 101. The gate module 101 has its pins 3 and 4 receive the T2 clock signal and the EOC signal, respectively. When both of these signals are high, a low is produced at pin 6 of the gate module 101 to the pin 2 (CLR input) of the latch 100. Since PR input (pin 13) of the latch 100 is always high, this results in the $\overline{GCMH_{10}}$ signal at pin 6 ($\overline{Q}$ output) of the latch 100 going high.

Accordingly, each of the two portions of the logic equation (23) for n=6, 7, 8, 9, or 10 is satisfied.

While the latch 100 has been shown and described for n=10, it should be understood that the $GCMH_{10}$ signal would normally never go from low to high during counting because this would indicate that the grating counter 78 did not have enough capacity. However, for each of the latches corresponding to the latch 100 for n=6, 7, 8, and 9, the $GCMH_n$ signal may normally go from low to high during counting.

The following logic equations for the states of the DCM 86 and the DCS 87 of the dot counter 79 can be written:

$$\text{Set } DCM_n = T1 \cdot \overline{SYNC} \cdot \overline{EOC} \cdot (DCS_1 \cdot DCS_2 \cdot \text{---} \cdot DCS_{n-1}) \cdot \overline{DCS_n} \quad (28)$$

$$\text{Reset } DCM_n = T1 \cdot \overline{SYNC} \cdot \overline{EOC} \cdot (DCS_1 \cdot DCS_2 \cdot \text{---} \cdot DCS_{n-1}) \cdot DCS_n + EOC \cdot T2 \quad (29)$$

$$\text{Set } DCS_n = T5 \cdot DCM_n \quad (30)$$

$$\text{Reset } DCS_n = T5 \cdot \overline{DCM_n} \quad (31)$$

$$(GCM = DCM) = \overline{BIT_1 \neq} \cdot \overline{BIT_2 \neq} \cdot \text{---} \cdot \overline{BIT_{10} \neq} \quad (32)$$

$$\overline{BIT_n \neq} = \overline{(GCMH_n + GCML_n) \cdot \overline{DCM_n} + (\overline{GCMH_n} + \overline{GCML_n}) \cdot DCM_n} \quad (33)$$

In each of the foregoing logic equations for the dot counter 79, n=1, 2, 3, 4, 5, 6, 7, 8, 9, or 10. It should be understood that $GCML_n$ or $\overline{GCML_n}$ is utilized in the logic equation (33) where n=1, 2, 3, 4, or 5 and that $GCMH_n$ or $\overline{GCMH_n}$ is employed where n=6, 7, 8, 9, or 10.

One example for forming the logic circuitry for the dot counter 79 is shown in FIGS. 10 and 10D with various logic elements of Texas Instruments being employed and n=10. It should be understood that the dot counter 79 would have similar types of elements for each of the first to the ninth bits (N=1, . . . , 9).

The dot counter 79 includes a gate 105 (see FIG. 10), which is the same type part as the gate 59 (see FIG. 4) of the PCM 53 of the pointer counter 52 and has all of its unused logic inputs held at a high logic level. The gate 105 (see FIG. 10) has its pins 1, 2, 3, 4, 5, 6, 7, 10, and 11 receive $DCS_1$, $DCS_2$, $DCS_3$, $DCS_4$, $DCS_5$, $DCS_6$, $DCS_7$ $DCS_8$, and $DCS_9$ signals, respectively. When each of these signals is high, a low appears at pin 9 of the gate 105 and is supplied to pin 13 of the inverter module 81 where it is inverted to a high output at pin 12. The high at pin 12 of the inverter module 81 is supplied to pins 4 and 10 of a latch 106, which is the same type part as the latch 58 (see FIG. 4) of the PCM 53 of the pointer counter 52 and has its unused logic inputs held at a high logic level.

The latch 106 (see FIG. 10) has its pin 5 receive a $\overline{DCS_{10}}$ signal from pin 6 ($\overline{Q}$ output) of a latch 107, which is one of the ten latches comprising the DCS 87 of the dot counter 79. The latch 107 is the same type part as the latch 58 (see FIG. 4) of the PCM 53 of the pointer counter 52 and has all of its unused logic inputs held at a high logic level.

The latch 106 (see FIG. 10) has each of its pins 3 and 11 connected to pin 2 of the inverter module 81. The inverter module 81 has its pin 1, which has its signal inverted by the inverter module 81 and produced at the pin 2 of the inverter module 81, connected to pin 8 of a gate module 108, which is the same type part as the gate module 56 (see FIG. 4) of the PCM 53 of the pointer counter 52 and has its unused logic inputs held at a high logic level. The gate module 108 (see FIG. 10) has the $\overline{EOC}$ signal supplied to its pin 9 from the EOC latch 55 (see FIGS. 2 and 8) and the $\overline{SYNC}$ signal supplied to its pin 11 from the SYNC latch 77 (see FIGS. 2 and 9). Therefore, when both the $\overline{EOC}$ signal and the $\overline{SYNC}$ signal are high, the gate module 108 has a low at its pin 8 so that a high signal is supplied to each of the pins 3 and 11 of the latch 106.

The latch 106 (see FIG. 10) has the T1 clock signal supplied to its pin 12 (CK input). Thus, when the $\overline{SYNC}$ and $\overline{EOC}$ signals are high, the $\overline{DCS_{10}}$ signal is high, and the input from the pin 12 of the inverter module 81 is high, the latch 106 produces a high $DCM_{10}$ signal at its pin 8 (Q output) when the T1 clock signal has been high and goes low if the $DCM_{10}$ signal was low or holds it at a high if it was already high. Whenever the $DCM_{10}$ signal changes state to a high, this advances the binary count in the DCM 86 by count of one. This satisfies the logic equation (28).

The latch 107 has the T5 clock signal supplied to its pin 12 (CK input) and the $\overline{DCM_{10}}$ signal from pin 6 ($\overline{Q}$ output) of the latch 106 supplied to its pin 10. Thus, if the $\overline{DCM_{10}}$ signal is high when the T5 clock signal has been high and goes low, the latch 107 has a high $\overline{DCS_{10}}$ signal at its pin 6 ($\overline{Q}$ output). If the $\overline{DCS_{10}}$ signal was already high, it would remain in this state.

The latch 106 has its pin 9 receiving a $DCS_{10}$ signal from pin 8 (Q output) of the latch 107. The $DCS_{10}$ signal is high when the $DCM_{10}$ signal from pin 8 (Q output) of the latch 106 is high since it is supplied to pin 4 of the latch 107. The $DCS_{10}$ signal goes high only when the T5 clock signal at the pin 12 (CK input) of the latch 107 has been high and goes low. It will stay in this state until the $\overline{DCM_{10}}$ signal at pin 6 ($\overline{Q}$ output) of the latch 106 goes high whereby this results in the $DCS_{10}$ signal going high and the $\overline{DCS_{10}}$ signal going low. This satisfies the logic equations (30) and (31).

When the latch 106 has a high signal at its pin 11 from the pin 2 of the inverter module 81, a high from the pin 12 of the inverter module 81 at its pin 10, and a high $DCS_{10}$ signal at its pin 9 from the pin 8 (Q output) of the latch 107, the latch 106 has a high $\overline{DCM_{10}}$ signal at its pin 6 ($\overline{Q}$ output) when the T1 clock signal has been high and goes low. This is a logical zero at the tenth bit location in the DCM 86. This satisfies the first portion of the logic equation (29).

Furthermore, the dot counter 79 cannot be counted when the $\overline{SYNC}$ signal or the $\overline{EOC}$ signal is low. As previously mentioned, this occurs when it is desired to inhibit counting of the dot counter 79 to enable the count of the grating counter 78 (see FIG. 2) to advance to be equal to the count of the dot counter 79.

While the latches 106 and 107 have been shown and described for n=10, it should be understood that the $\overline{DCM_{10}}$ and the $\overline{DCS_{10}}$ signals would normally never go from low to high during counting because this would indicate that the dot counter 79 did not have enough capacity. However, for each of the latches corresponding to each of the latches 106 and 107 for n=1, 2, 3, 4, 5, 6, 7, 8, and 9, the $\overline{DCM_n}$ and $\overline{DCS_n}$ signals may normally go from low to high during counting.

The gate module 108 (see FIG. 10) has the T2 clock signal supplied to its pin 3 and the EOC signal from the EOC latch 55 (see FIG. 8) supplied to its pin 5. When both of these inputs are high, the gate module 108 (see FIG. 10) has a low at its pin 6. This low is supplied to pin 2 (CLR input) of the latch 106 to cause the latch 106 to have a high $\overline{DCM_{10}}$ signal at its pin 6 ($\overline{Q}$ output) since pin 13 (PR input) of the latch 106 is always high.

Accordingly, the second portion of the logic equation (29) is satisfied when the T2 clock signal is high and the EOC signal is high because the end of a character occurs. At this time, the latch 106 (see FIG. 10) and each of the corresponding latches for each of the other nine bits of the DCM 86 of the dot counter 79 is set at zero to start the dot counter 79 to count again from zero. Thus, the second portion of the logic equation (29) is when counting again begins in the dot counter 79 at the start of another character. This reset last occurs at the time of the T2 clock signal of the last drop time of the previous character.

The dot counter 79 has a gate module 110 (see FIG. 10A), which has all of its unused logic inputs held at a high logic level. One suitable example of the gate module 110 is a dual 2-wide 2-input and-or-invert gate sold by Texas Instruments as model SN7451 (J).

The gate module 110 has a $GCMH_{10}$ signal supplied to its pin 2 from the latch 110 (see FIG. 11) of the GCMH 83 of the grating counter 78 and the $\overline{DCM_{10}}$ signal supplied to its pin 3 from the pin 6 ($\overline{Q}$ output) of the latch 106 (see FIG. 10). When both of these are high, the gate module 110 (see FIG. 10A) has a low $\overline{BIT_{10}\neq}$ at its pin 6.

Similarly, the gate module 110 has a $\overline{GCMH_{10}}$ signal from the latch 100 (see FIG. 11) of the GCMH 83 of the grating counter 78 supplied to its pin 4 (see FIG. 10A) and the $DCM_{10}$ signal from the pin 8 (Q output) of the latch 106 (see FIG. 10) supplied to its pin 5. When both of these are high, the $\overline{BIT_{10}\neq}$ signal at pin 6 of the gate module 110 (see FIG. 10A) is low. These satisfy the logic equation (33).

The gate module 110 has a $GCML_1$ signal supplied to its pin 1 from a latch, which corresponds to the latch 92 (see FIG. 11), of the GCML 82 of the grating counter 78 and a $\overline{DCM_1}$ signal supplied to its pin 13 from a latch, which corresponds to the latch 106 (see FIG. 10) of the DCM 86. When both of these are high, the gate module 110 (see FIG. 10A) has a low $\overline{BIT_1\neq}$ at its pin 8.

Similarly, the gate module 110 has a $\overline{GCML_1}$ signal from a latch, which corresponds to the latch 92 (see FIG. 11), of the GCML 82 of the grating counter 78 supplied to its pin 10 (see FIG. 10A) and a $DCM_1$ signal from a latch, which corresponds to the latch 106 (see FIG. 10), of the DCM 86 supplied to its pin 9. When both of these are high, the $\overline{BIT_1\neq}$ signal at the pin 8 of the gate module 110 (see FIG. 10A) is low. These also satisfy the logic equation (33).

The gate 80 (see FIG. 10) has its pins 1, 2, 3, 4, 5, 6, 7, 10, 11, and 12 receive the $\overline{BIT_1\neq}$, $\overline{BIT_2\neq}$, $\overline{BIT_3\neq}$, $\overline{BIT_4\neq}$, $\overline{BIT_5\neq}$, $\overline{BIT_6\neq}$, $\overline{BIT_7\neq}$, $\overline{BIT_8\neq}$, $\overline{BIT_9\neq}$, and $\overline{BIT_{10}\neq}$ signals, respectively. When all of these are high, the gate 80 has a low $\overline{GCM=DCM}$ signal at its pin 9. This results in a high GMC=DCM signal at pin 6 of the inverter module 81 to satisfy the logic equation (32).

As previously mentioned, the voltage register 64 (see FIG. 2) receives the first ten bits from the FROS 51. The following logic equations for the voltage register 64 can be written:

$$\text{Set } V_n = T5 \cdot RLS = 0 \cdot FROS_n \quad (34)$$

$$\text{Reset } V_n = T5 \cdot RLS = 0 \cdot \overline{FROS}_n \quad (35)$$

In each of the foregoing logic equations for the voltage register 64, n=1, 2, 3, 4, 5, 6, 7, 8, 9, or 10.

Figures 15, 16:
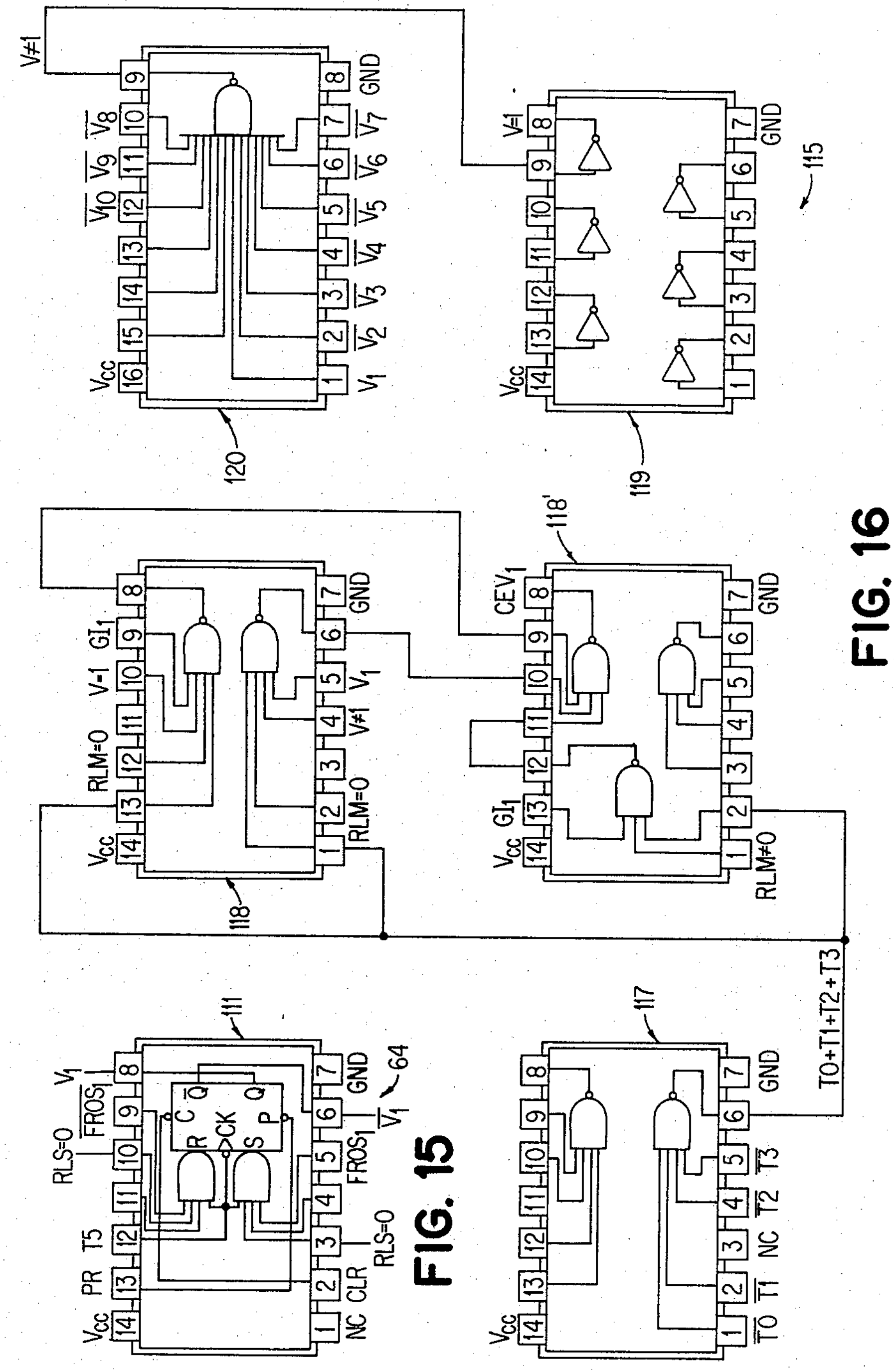
FIG. 15 is a schematic block diagram of one latch of a voltage register of the control apparatus of the present invention.
FIG. 16 is a schematic block diagram of a portion of a charge electrode gate of the control apparatus of the present invention for controlling the supply of voltage to a charge electrode for charging the ink droplets.

The voltage register 64 comprises ten latches (one shown at 111 in FIG. 15 for n=1). The latch 111 is the same type part as the latch 58 (see FIG. 4) and has each of its unused logic inputs held at a high logic level.

The latch 111 (see FIG. 15) has the RLS=0 signal from pin 12 of the inverter module 69 (see FIG. 6) of the run length counter 62 supplied to each of its pins 3 (see FIG. 15) and 10. The latch 111 has an $FROS_1$ signal from the FROS 51 (see FIG. 2) supplied to its pin 5 (see FIG. 15) and the T5 clock signal supplied to its pin 12 (CK input).

When the RLS32 0 signal is high and the $FROS_1$ signal from the FROS 51 is high, the latch 111 produces a high $V_1$ signal at its pin 8 (Q output) when the T5 clock signal has been high and goes low. This satisfies the logic equation (34) for n=1.

The latch 111 has an $\overline{FROS_1}$ signal from the FROS 51 (see FIG. 2) supplied to its pin 9 (see FIG. 15). Therefore, if the RLS=0 signal is high and the $\overline{FROS_1}$ signal is high, the latch 111 produces a high $\overline{V}_1$ signal at its pin 6 ($\overline{Q}$ output ) when the T5 clock signal has been high and goes low. This satisfies the logic equation (35) for n=1.

Accordingly, when the RLM 65 (see FIG. 2) of the run length counter 62 is at a count of zero, the state of each of the bits in the voltage register 64 is produced for supply to a digital to analog converter (DAC) 112, which converts the digital signal from the voltage register 64 into an analog voltage for supply to a charge electrode driver 113, which amplifies the analog voltage from the DAC 112 for supply to the charge electrode 24.

The logic equations for a charge electrode voltage (CEV) gate 115, which determines when the charge electrode voltage is supplied to the DAC 111, are:

$$\begin{aligned} CEV_n = {} & (T0 + T1 + T2 + T3) \cdot RLM = 0 \cdot V_n \cdot V \neq 1 + \\ & (T0 + T1 + T2 + T3) \cdot (RLM \neq 0) \cdot GI_n + \\ & (T0 + T1 + T2 + T3) \cdot V = 1 \cdot GI_n \cdot RLM = 0 \end{aligned} \quad (36)$$

$$V = 1 = V_1 \cdot \overline{V_2} \cdot \overline{V_3} \cdot \overline{V_4} \cdot \overline{V_5} \cdot \overline{V_6} \cdot \overline{V_7} \cdot \overline{V_8} \cdot \overline{V_9} \cdot \overline{V_{10}} \quad (37)$$

The CEV gate 115 controls whether the voltage from the voltage register 64 or from a gutter induction read only storage (GIROS) 116 supplies the digital voltage signal to the DAC 112. It is necessary for the charge electrode 24 to receive a voltage to compensate for induction produced on the droplets 23, which are not to be printed and have an induction due to the charge on the prior droplets 23.

Only the voltages induced by the two prior droplets 23 are utilized to compensate for induction. It should be understood that compensation for induction could be dependent on more than two of the prior droplets 23 if desired. This would necessitate further circuitry beyond that disclosed.

One example for forming the CEV gate 115 is shown in FIG. 16 wherein various logic elements of Texas Instruments are employed. It should be understood that the CEV gate 115 would have to include similar elements for each of the second through tenth bits in the same manner as shown for n=1 in FIG. 16.

The CEV gate 115 includes gate modules 117, 118, and 118', an inverter module 119, and a gate 120. Each of the gate modules 117 and 118 is the same type part as the gate module 76 (see FIG. 6) of the RLM 65 of the run length counter 62 and has its unused logic inputs held at the high logic level. The gate module 117 (see FIG. 16) has its pins 1, 2, 4, and 5 receive $\overline{T0}$, $\overline{T1}$, $\overline{T2}$, and $\overline{T3}$ signals, respectively. These are the inverse of the T0, T1, T2, and T3 clock signals. Whenever any of the $\overline{T0}$, $\overline{T1}$, $\overline{T2}$, and $\overline{T3}$ signals is low to indicate that the specific clock signal is up such as the $\overline{T0}$ signal is low when the T0 clock signal is up, for example, the gate module 117 (see FIG. 16) has a high at its pin 6. This is supplied to pins 1 and 13 of the gate module 118 and pin 2 of the gate module 118', which is the same type part as the gate module 56 (see FIG. 4).

The $V_1$ signal from pin 8 (Q output) of the latch 111 (see FIG. 15) of the voltage register 64 is supplied to pin 5 of the gate module 118 (see FIG. 16). The gate module 118 has the RLM=0 signal supplied to its pin 2 from pin 10 of the inverter module 69 (see FIG. 6) of the RLM 65 of the run length counter 62. The gate module 118 (see FIG. 16) has a V≠1 signal supplied to its pin 4 from pin 9 of the gate 120, which is the same type part as the gate 59 (see FIG. 4) of the PCM 53 of the pointer counter 52 and has all of its unused logic inputs held at a high logic level.

When each of the inputs to the pins 1, 2, 4, and 5 of the gate module 118 (see FIG. 16) is high, the gate module 118 has a low at its pin 6, which is connected to pin 10 of the gate module 118'. Therefore, when a low is at the pin 10 of the gate module 118', the gate module 118' has a high $CEV_1$ signal at its pin 8. This satisfies the first portion of the logic equation (36).

The gate module 118 has a $GI_1$ signal supplied to its pin 9 from a gutter induction (GI) register 121 (see FIG. 2). The gate module 118 (see FIG. 16) has the RLM=0 signal supplied to its pin 12 from the pin 10 of the inverter module 69 (see FIG. 6) of the RLM 65 of the run length counter 62. The gate module 118 (see FIG. 16) has a V=1 signal supplied to its pin 10 from pin 8 of the inverter module 119, which receives the V≠1 signal at its pin 9 from the pin 9 of the gate 120.

When the inputs to each of the pins 9, 10, 12, and 13 of the gate module 118 are high, the gate module 118 has a low at its pin 8, which is connected to pin 9 of the gate module 118'. When there is a low on the pin 9 of the gate module 118', the gate module 118' has a high $CEV_1$ signal at its pin 8. This satisfies the third portion of the logic equation (36).

The gate module 118' has a $GI_1$ signal supplied to its pin 13 from the gutter inductance (GI) register 121 (see FIG. 2). The gate module 118' (see FIG. 16) has the RLM≠0 signal from pin 8 of the gate 75 (see FIG. 6) of the RLM 65 of the run length counter 62 supplied to its pin 1.

When each of the inputs to the pins 1, 2, and 13 of the gate module 118' (see FIG. 16) is high, a low is supplied to pin 11 of the gate module 118'. Therefore, when the pin 11 of the gate module 118' is low, the gate module 118' has a high $CEV_1$ signal at its pin 8. This satisfies the second portion of the logic equation (36).

The gate 120 (see FIG. 16) has its pins 1, 2, 3, 4, 5, 6, 7, 10, 11, and 12 receive $V_1$, $\overline{V_2}$, $\overline{V_3}$, $\overline{V_4}$, $\overline{V_5}$, $\overline{V_6}$, $\overline{V_7}$, $\overline{V_8}$, $\overline{V_9}$, and $\overline{V_{10}}$ signals, respectively. The $V_1$ signal is produced at pin 8 (Q output) of the latch 111 (see FIG. 15) of the voltage register 64 while the $\overline{V_2}$, $\overline{V_3}$, $\overline{V_4}$, $\overline{V_5}$, $\overline{V_6}$, $\overline{V_7}$, $\overline{V_8}$, $\overline{V_9}$, and $\overline{V_{10}}$ signals are the inverse of the signals in the voltage register 64 for the second to tenth bits and are at the $\overline{Q}$ output of the latches corresponding to the latch 111. When all of the inputs to the pins 1-7, 10, 11, and 12 of the gate 120 (see FIG. 16) are high, the gate 120 has a low V≠1 signal at its pin 9, which is supplied to the pin 9 of the inverter module 119 and inverted to a high V=1 signal at the pin 8 of the inverter module 119. This satisfies the logic equation (37).

It should be understood that the V=1 signal is high only when the voltage register 64 (see FIGS. 2 and 15) has a binary count of one therein. That is, all of the bits except the first bit are low. The V=1 signal is utilized in the EOC latch 55 (see FIG. 8) to set the EOC signal at a high. The following logic equations are utilized with the EOC latch 55:

$$\text{Set } EOC = T7 \cdot_{v=1} \cdot RLM=0 \tag{38}$$

$$\text{Reset } EOC = T4 \tag{39}$$

The EOC latch 55 includes a gate module 123 (see FIG. 8), which is the same type part as the gate module 79B (see FIG. 9) of the SYNC latch 77 and has its unused logic inputs held at a high logic level, and an inverter module 124 (see FIG. 8), which is the same type part as the inverter module 57' (see FIG. 4). The gate module 123 (see FIG. 8) of the EOC latch 55 has the V=1 signal from the pin 8 of the inverter module 119 (see FIG. 16) of the CEV gate 115 supplied to its pin 2 (see FIG. 8). The gate module 123 of the EOC latch 55 has the RLM=0 signal from pin 10 of the inverter module 69 (see FIG. 6) of the RLM 65 of the run length counter 62 supplied to its pin 3 (see FIG. 8). The T7 clock signal is supplied to pin 1 of the gate module 123 of the EOC latch 55.

When the gate module 123 of the EOC latch 55 has each of its pins 1, 2, and 3 high, the EOC signal at pin 8 of the gate module 123 goes down. The EOC signal is supplied to pin 1 of the inverter module 124 where it is inverted to supply a high EOC signal when the T7 clock signal, the V=1 signal, and the RLM=0 signal are high.

This high EOC signal indicates that the start of the next character can occur at the next drop time if there is the start of a high GP signal from the grating 15 (see FIG. 1) during this drop time. This high EOC signal is utilized to cause further processing, as previously discussed, with respect to transferring data from the PROS 50 (see FIG. 2) to the pointer counter 52 and resetting the dot counter 79 to a count of zero.

The gate module 123 (see FIG. 8) of the EOC latch 55 has the EOC signal from the pin 2 of the inverter module 124 supplied to its pin 12 and a $\overline{T4}$ clock signal, which is the inverse of the T4 clock signal, supplied to its pin 13. Thus, when the EOC signal goes high at the T7 clock signal, the inputs to the pins 12 and 13 are high to hold the EOC signal in its high state after the T7 clock signal goes down.

When the T4 clock signal of the next drop time goes high after the EOC signal has gone high, the $\overline{T4}$ signal at the pin 13 of the gate module 123 goes low to cause the $\overline{EOC}$ signal to go high and the EOC signal to go low. This state of the EOC latch 55 remains until the next time that each of the inputs to the pins 1, 2, and 3 of the gate 123 of the EOC latch 55 go high. Thus, the EOC latch 55 satisfies both of the logic equations (38) and (39).

The seven most significant bits of the voltage output of the CEV gate 115 (see FIG. 2) also are transmitted to a first order induction (FOI) register 125 and the three most significant bits also are transmitted to a second order induction (SOI) register 126, which includes a master second order induction (SOIM) register 127 and a slave second order induction (SOIS) register 128.

Figure 18:
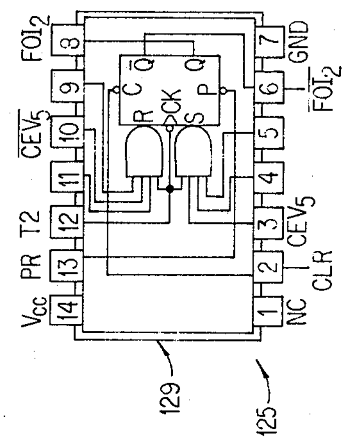
FIG. 18 is a schematic block diagram of one latch of a first order induction register of the control apparatus of the present invention.

The FOI register 125 includes seven latches (one shown at 129 in FIG. 18 for n=2). The latch 129, which is the same type part as the latch 58 (see FIG. 4) of the PCM 53 of the pointer counter 52 and has its unused logic inputs held at a high logic level, satisfies the two following logic equations where n=1, 2, 3, 4, 5, 6, or 7:

$$\text{Set } FOI_n = T2 \cdot CEV_{n+3} \quad (40)$$

$$\text{Reset } FOI_n = T2 \cdot \overline{CEV}_{n+3} \quad (41)$$

The latch 129 (see FIG. 18), which is for n=2, has the $CEV_5$ signal supplied from the CEV gate 115 (see FIG. 16) to its pin 3. When the T2 clock signal, which is supplied to pin 12 (CK input) of the latch 129 (see FIG. 18), has been high and goes low and the $CEV_5$ signal is high, the latch 129 has a high $FOI_2$ signal at its pin 8 (Q output). This satisfies the logic equation (40) in that the second bit in the FOI register 125 is the fifth bit of the ten bits supplied from the CEV gate 115 (see FIG. 2). This is because the FOI register 125 stores the digital signals from the seven most significant bits of the ten bits supplied from the voltage register 64.

If the $\overline{CEV_5}$ signal, which is supplied from the CEV gate 115 (see FIG. 16) to pin 10 of the latch 129 (see FIG. 180, is high, then the latch 129 provides a high $\overline{FOI_2}$ signal at its pin 6 ($\overline{Q}$ output). This satisfies the logic equation (41).

The SOIM register 127 (see FIG. 2) receives the three most significant bits from the CEV gate 115 at the same time that the seven most significant bits are supplied to the FOI register 125. Therefore, the following two logic equations are applicable to the SOIM register 127 where n=1, 2, or 3:

$$\text{Set } SOIM_n = T2 \cdot CEV_{n+7} \quad (42)$$

$$\text{Reset } SOIM_n = T2 \cdot \overline{CEV_{n+7}} \quad (43)$$

Figure 19:
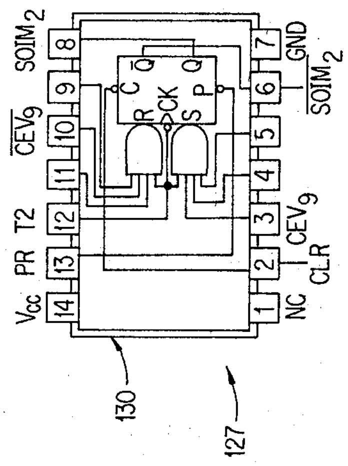
FIG. 19 is a schematic block diagram of one latch of a master second order induction register of a second order induction register of the control apparatus of the present invention.

In FIG. 19, there is shown a latch 130 for n=2 (the same example for the latch 129 in FIG. 18) of the SOIM register 127. The latch 130, which is the same type part as the latch 58 (se FIG. 4) of the PCM 53 of the pointer counter 52 and has all of its unused logic inputs held at a high logic level, has the $CEV_9$ signal from the CEV gate 115 (see FIG. 16) supplied to its pin 3 (see FIG. 19). When the $CEV_9$ signal is high and the T2 clock signal supplied to pin 12 (CK input) of the latch 130 has been high and goes low, the latch 130 produces a high $SOIM_2$ signal at its pin 8 (Q output). This satisfies the logic equation (42) for n=2. The latch 130 has the $\overline{CEV_9}$ signal supplied from the $\overline{CEV}$ gate 115 (see FIG. 16) to its pin 10 (see FIG. 19). When the $\overline{CEV_9}$ signal is high and the T2 clock signal has been high and goes low, the latch 130 produces a high $SOIM_2$ signal at its pin 6 ($\overline{Q}$ output). This satisfies the logic equation (43) for n=2.

It should be understood that the SOIM register 127 contains two other latches, which are the same as the latch 130. These latches are for n=1 and n=3.

The SOIS register 128 (see FIG. 2) has the three bits in the SOIM register 127 transferred to it at the time of the T6 clock signal. This is after the GIROS 116 has been addressed by the seven bits in the FOI register 125 and the three bits in the SOIS register 128. Thus, the state of the three bits in the SOIS register 128 is produced one cycle earlier than that in the FOI register 125 because of the transfer of the data from the SOIM register 127 to the SOIS since the GIROS 116 produces its output to the GI register 121 at the T4 clock signal.

Figure 20:
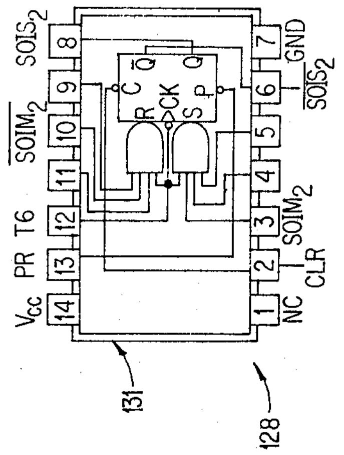
FIG. 20 is a schematic block diagram of one latch of a slave second order induction register of the second order induction register of the control apparatus of the present invention.

The SOIS register 128 has three latches (one shown at 131 in FIG. 20 for n=2). The latch 131 is the same type part as the latch 58 (see FIG. 4) of the PCM 53 of the pointer counter 52 and has each of its unused logic inputs held at a high logic level.

The following two logic equations are applicable to the SOIS register 128 (see FIG. 2) for n=1, 2, or 3:

$$\text{Set} SOIS_n = T6 \cdot \overline{SOIM_n} \quad (44)$$

$$\text{Reset } SOIS_n = T6 \cdot SOIM_n \quad (45)$$

The latch 131 (see FIG. 20) has the $SOIM_2$ signal from pin 8 (Q output) of the latch 130 (see FIG. 19) of the SOIM register 127 supplied to its pin 3. The T6 clock signal is supplied to pin 12 (CK input) of the latch 131 (see FIG. 20). Therefore, when the $SOIM_2$ signal is high and the T6 clock signal has been high and goes low, the latch 131 has a high $SOIS_2$ signal at its pin 8 (Q output). This satisfies the logic equation (44) for n=2.

The latch 131 has its pin 10 receive the $\overline{SOIM_2}$ signal from pin 6 ($\overline{Q}$ output) of the latch 130 (see FIG. 19) of the SOIM register 127. Therefore, when the $\overline{SOIM_2}$ signal is high and the T6 clock signal has been high and goes low, the latch 131 (see FIG. 20) has a high $\overline{SOIS_2}$ signal at its pin 6 ($\overline{Q}$ output). This satisfies the logic equation (45).

Accordingly, each of the three latches (one shown at 131) of the SOIS register 128 (see FIG. 2) has the same data therein as is in the SOIM register 127. However, its transfer from the SOIM register 127 to the SOIS register 128 is delayed so that it is supplied to the GIROS 116 (see FIG. 2) one cycle later so that the portion of the address for the GIROS 116 from the SOIS register 128 for the droplet 23 due to induction is because of the second prior droplet 23, rather than the first prior droplet 23 as is the portion of the address for the GIROS 116 in the FOI register 125.

The GI register 121 has eight latches (one shown at 132 in FIG. 17 for n=2)with each being for a different bit where n varies from one to eight. Thus, the eight-bit output from the GIROS 116 (see FIG. 2) is transferred to the GI register 121 when the T4 clock signal has been high and goes low. If the count in the RLM 65 (see FIG. 6) of the run length counter 62 is not zero so that the RLM≠0 signal is high, then the CEV gate 115 (see FIG. 2) gates the eight bits in the GI register 121 to the DAC 112.

Figure 17:
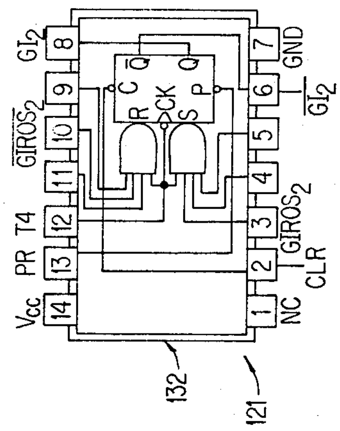
FIG. 17 is a schematic block diagram of one latch of a gutter induction register of the control apparatus of the present invention.

The latch 132 (see FIG. 17), which is the same type part as the latch 58 (see FIG. 4) of the PCM 53 of the pointer counter 52 and has each of its unused logic inputs held at a high logic level, has the $GIROS_2$ signal supplied from the GIROS 116 (see FIG. 2) to its pin 3 (see FIG. 17). When the T4 clock signal, which is supplied to pin 12 (CK input) of the latch 132 has been high and goes low with the $GIROS_2$ signal being high, the latch 132 has a high $GI_2$ signal at its pin 8 (Q output).

The latch 132 receives a $\overline{GIROS_2}$ signal, which is the logical inversion of the $GIROS_2$ signal from the GIROS 116 (see FIG. 2), at its pin 10 (see FIG. 17). If the $\overline{GIROS_2}$ signal is high, then a high $\overline{GI_2}$ signal is produced at pin 6 ($\overline{Q}$ output) of the latch 132 when the T4 clock signal has been high and goes low. This is just after completion of supply of the prior voltage to the DAC 112 through the CEV gate 115 since this occurs from the time that the T0 clock signal goes up until the T3 signal goes down. This is the length of time that voltage is applied to the charge electrode 24 with break off of the droplets 23 occurring approximately at the end of the T1 time period as shown in FIG. 3A. By using the T2 and T3 clock signals after break off to continue to enable the charge electrode 24 (see FIG. 2) to receive the charge, this insures that a charge is applied even if break off of the droplet 23 occurs later than the end of the T1 clock signal.

The clock signals are synchronized with the break off of the droplets 23 so that break off occurs as close to the junction of the T1 and the T2 clock signals as possible. One suitable means of accomplishing this is shown and described in U.S. Pat. No. 4,150,384 to Meece.

The latch 132 satisfies the two following logic equations for n=2:

$$\text{Set } GI_n = T4 \cdot GIROS_n \quad (46)$$

$$\text{Reset } GI_n = T4 \cdot \overline{GIROS_n} \quad (47)$$

It should be understood that similar latches are used for n=1, 3, 4, 5, 6, 7, and 8 to satisfy the two logic equations (46) and (47).

Considering the operation of the apparatus of the present invention, the printing of a character requires an eight-bit character code to be supplied to the PROS 50 (see FIG. 2) to address the PROS 50 in accordance with the character that is to be printed. This address in the PROS 50 provides a sixteen-bit word as its output with the word identifying the location within the FROS 51 where the data to print the character begins.

The sixteen-bit word from the PROS 50 is gated to the PCM 53 of the pointer counter 52 during the last drop of time of the preceding character as shown in FIG. 3A. This occurs when the T2 clock signal has been high and goes low, the EOC signal from the EOC latch 55 (see FIGS. 2 and 8) is high, and the GD signal from the GD latch 55' (see FIGS. 2 and 14) is high.

If there is no preceding character, this would still occur in a corresponding drop time just prior to the first drop of time of the character to be printed. This would require the EOC latch 55 (see FIG. 8) to have the EOC signal at pin 2 of the inverter module 124 raised to a high at the time that the clock signal T7 is high in a drop time corresponding to the drop time prior to the last drop time of the previous character.

In either situation, the sixteen-bit word from the PROS 50 (see FIG. 2) is gated into the PCM 53 in the drop time preceding the first drop time of the character to be printed. This sixteen-bit word is transferred into the PCS 54 of the pointer counter 52 from the PCM at the T5 clock signal of the last drop time of the previous character.

The sixteen-bit word in the PCM 53 of the pointer counter 52 is gated as an address directly to the FROS 51. This address from the PCM 53 of the pointer counter 52 selects the location within the FROS 51 from which the first sixteen-bit word from the FROS 51 will be produced as an output.

This sixteen-bit word comprises a ten-bit voltage, which is gated into the voltage register 64 at the T5 clock signal of the same drop time as when the sixteen-bit word is gated into the PCM 53 from the PROS 50. At the same time, a six-bit run length is gated into the RLM 65 of the run length counter 62. The run length counter 62 has a count, which specifies the number of non-printing drop times until the droplet 23 is to be printed during this count of the run length counter 62. This can vary from 0 to 63 and is the distance of the droplet 23, which is to be printed, from the prior printed droplet 23 or from a margin if it is the first of the droplets 23 to be printed. It should be understood that one of the droplets 23 may not be printed each time that the run length counter 62 is set to 63 such as when the character is a period, for example.

It also should be understood that there may be no printing of any of the droplets 23 throughout the time that a character is to be printed. Thus, this would be a full space, for example, between characters. This is handled by setting the PCM 53 to a value that causes the FROS 51 to continuously set the voltage register 64 at a count of one and the RLM 65 at a count of zero.

The dot counter 79 is a direct count of the droplets 23 except when it is necessary to stop counting of the dot counter 79 to enable the grating counter 78 to catch up with the count of the dot counter 79 so that the grating counter 78 has the same count as the dot counter 79. This occurs only when four or more of the sequential droplets 23 are not to be printed.

The dot counter 79 is set at the count of zero during the T2 clock signal in the last spot time of the previous character. This requires the EOC signal to be up and the T2 clock signal to be up. The GCML 82 and the GCMH 83 of the grating counter 78 also are set at zero at this time.

The grating counter 78 counts from zero to thirty-one so this is a total of thirty-one counts. This plus the reset of the grating counter 78 from thirty-one to zero corresponds to the minimum of thirty-two drop times between the grating pulses because of the grating 15 (see FIG. 1) providing 240 grating pulses per inch (94.488 pulses per cm) and there being a total of at least 7680 drop times per linear inch (3023.622 drop times per linear centimeter) of travel of the carrier 12.

The grating counter 78 (see FIG. 2) is counting at the same frequency at which the droplets 23 are produced. As previously mentioned, the velocity of the carrier 12 (see FIG. 1) is such that it will not travel the distance between grating pulses from the grating 15 in thirty-two drop times. Therefore, it is necessary to stop the count of the grating counter 78 (see FIG. 2) until the next high GD signal occurs from the GD latch 55'. However, the dot counter 79 continues to count upwardly.

The counting of the dot counter 79 is inhibited when its count is greater than the grating counter 78 and the run length counter 62 has a count of greater than three in the RLM 65 (the RLM>3 signal is high) to indicate that there are four or more of the droplets 23 in sequence that are not to be printed.

When this occurs, a high SYNC signal appears at pin 4 of the inverter module 79C (see FIG. 9) of the SYNC latch 77 to inhibit counting of the dot counter 79 (see FIG. 2) and the run length counter 62. This has the effect of inserting the required non-printed droplets 23 to synchronize the location of the carrier 12 (see FIG. 1) with the position to which the printed droplets 23 are to be applied to the recording surface 14.

As soon as the grating counter 78 (see FIG. 2) has its count equal to the dot counter 79, the SYNC latch 77 (see FIG. 9) changes state when the next T7 clock signal goes up so that the $\overline{\text{SYNC}}$ signal goes high and the SYNC signal goes low. This enables counting of the dot counter 79 (see FIG. 2) and the run length counter 62 to again proceed.

The inhibiting of the counting of the dot counter 79 and the restarting thereof are shown in FIG. 3B. In the first drop time in FIG. 3B, the RLM 65 has a count of $x+1>4$ during the first part of the first drop time where x is at least four. The count in the GCML 82 was thirty-one in the drop time prior to the first drop time. The count in the GCMH 83 was 32m where m represents the number of times that the GCML 82 has counted thirty-two drop times after the GCMH 83 has been set to a count of zero.

The count in the DCM 86 is equal to the sum of the counts in the GCML 82 and the GCMH 83 in the drop time prior to the first drop time so that the DCM 86 has a count of 32m+31. This is shown in FIG. 3B in that the GCM=DCM signal is high in the drop time prior to the first drop time.

During the first drop time shown in FIG. 3B, there is no change in the count in the GCML 82 or the GCMH 83. This is because the GCML 82 cannot be advanced from the count of thirty-one to zero until the GD signal from the GD latch 55' is up at the time that one of the T2 clock signals goes up. The count in the GCMH 83 can only be advanced when the GCML 82 has its count advanced from thirty-one to zero.

During the first drop time shown in FIG. 3B, the count in the DCM 86 is increased by one as shown by the count in the DCM 86 being 32m+32. During this first drop time, the count in the RLM 65 changed from x+1>4 to x at the T5 clock signal. Thus, at the start of the T0 clock signal of the second drop time, the SYNC signal goes up because the GCM=DCM signal is down and the count in the RLM 65 is greater than three since x is at least four.

During the second drop time, the counting in the DCM 86 cannot be increased because the SYNC signal is up. Therefore, during the second drop time, there is no counting in the GCML 82, the GCMH 83, or the DCM 86. There also is no down-counting of the count in the RLM 65 because the SYNC signal went up at the T0 clock signal of the second drop time.

In FIG. 3B, it is assumed that the grating 15 (see FIG. 1) produces a high GP signal during the second drop time and that this occurs prior to the T7 clock signal as shown in FIG. 3B. Accordingly, the GD signal goes up at the T7 clock of the second drop time.

Therefore, in the third drop time, the count in the GCML 82 is changed from thirty-one to zero at the T2 clock signal because the GD signal from the GD latch 55' is high. This also increases the count in the GCMH 83 by a count of one because the GCML 82 has counted thirty-two times. It should be understood that the count in the GCMH 83 increased when the T1 clock signal went down in accordance with the logic equation (22) and the second portion of the logic equation (23) while the count in the GCML 82 changed at the time that the T2 clock signal went up.

However, because the SYNC signal is still up in the third drop time at the T2 clock signal, the DCM 86 is still inhibited from counting. Therefore, the count in the DCM 86 remains the same as it was in the second drop time.

Accordingly, the GCM=DCM signal again goes high at the T2 clock signal of the third drop time. As a result, the SYNC signal from the SYNC latch 77 goes down at the T7 clock signal of the third drop time. The GD signal from the GD latch 55' went down at the time that the T5 clock $\underline{\text{signal}}$ went up.

Thus, with the $\overline{\text{SYNC}}$ signal again being up rather than the SYNC signal being high, the count in the DCM 86 can again be increased by a count of one during the fourth drop time of FIG. 3B. Since the RLM 65 changes its count at the time that the T5 clock signal goes up, it does not change its count in the third drop time from that in the second drop time because the SYNC signal is still high at the time that the T5 clock signal is up.

Accordingly, the count in the RLM 65 does not change until the time that the T5 clock signal goes up in the fourth drop time as shown in FIG. 3B. During this fourth drop time, the count in each of the GCML 82 and the DCM 86 is advanced by a count of one.

The zero count in the dot counter 79 is set only in the DCM 86 at the T2 clock signal with the EOC signal being up. The DCS counter 87 of the dot counter 79 is set at zero at the T5 clock signal of the same drop time, which is the last spot time of the previous character.

The zero count in the GCML 82 (see FIG. 2) is transferred to the GCSL 84 at the time that the T5 clock signal falls. Similarly, the zero count in the GCMH 83 is transferred to the GCSH 85 at the time that the T5 clock signal in the last spot time of the previous character falls.

As each of the droplets 23 is produced, the dot counter 79 (see FIG. 2) counts each of the droplets 23 as does the grating counter 78. However, there is stopping of the grating counter 78 after thirty-one counts until another of the GD signals from the GD latch 55' is high.

The RLM 65 of the run length counter 62 transfers the count therein to the RLS 66 at the T1 clock signal of the first drop time of the character to be printed. The RLM 65 is down counted by the RLS 66 at the T5 clock signal of the first drop time of the character to be printed.

When the count in the RLM 65 (see FIG. 2) reaches zero at one of the T5 clock signals, a ten-bit voltage in the voltage register 64 is gated during the T0, T1, T2, and T3 clock signals of the next drop time since the RLM=0 signal goes high at the T5 clock signal. Thus, when the RLM=0 signal goes high, the gating of the voltage from the voltage register 64 by the CEV gate 115 causes the charge electrode 24 to have the desired voltage thereon to charge the droplet 23 to the desired magnitude. This produces the desired deflection of the droplet 23, when it is to be printed, so that it strikes the recording surface 14 (see FIG. 1) at the desired vertical location relative to a predetermined position, which is the gutter stream. In FIG. 2, the use of the term "without wrap" with the downcounting of the RLM 65 means that the count in the RLM 65 cannot be changed from zero without an external signal.

As previously mentioned, one of the droplets 23 may not be printed each time that the run length counter 62 is set to the count of 63. Therefore, when there is not to be printing of one of the droplets 23 after the run length counter 62 has down-counted to zero, the voltage register 64 has V=2. This voltage is not large enough to enable the droplet 23 to avoid the gutter 27 so that the droplet 23 will strike the gutter 27.

At the end of the T1 clock signal after the RLM 65 (see FIG. 2) is down counted to the count of zero, the RLS 66 is set at a count of zero. This T1 clock signal is during the time when the voltage is being gated from the voltage register 64 to the charge electrode 24.

When the RLS 66 is at the count of zero, the RLS=0 signal is high. This is utilized to cause an up count of one in the PCM 53 of the pointer counter 52 from the PCS 54. As a result, at the time that the charge electrode 24 is receiving a voltage in accordance with the output of the voltage register 64, the FROS 51 is being accessed upwardly one line.

As a result, at the T5 clock signal in the cycle in which the charge electrode 24 receives a voltage, the voltage register 64 and the run length counter 62 receive new information from the FROS 51.

The seven most significant bits of the ten-bit voltage transmitted to the DAC 112 also are transmitted to the FOI register 125. The three most significant bits of the ten bits also are transferred to the SOIM register 127 at the same time. This is during the T2 clock signal.

The data in the FOI register 125 and in the SOIS register 128 are utilized to access the GIROS 116.

However, the data from the SOIS register 128 is due to the prior voltage signal supplied to the DAC 112 through the CEV gate 115. This could be from the GI register 121 rather than from the voltage register 64 unless two of the droplets 23 were printed consecutively.

In either situation, the GIROS 116 supplies an eight-bit output at the T4 clock signal to the GI register 121. This is just after stopping supply of the voltage to the charge electrode 24 since voltage is stopped when the T3 clock signal went down. Therefore, an eight-bit voltage, which compensates for induction from the last two droplets 23, is available for supply to the DAC 112 if the ten-bit voltage from the voltage register 64 is not to be transmitted to the DAC 112.

The FOI register 125 receives only the five most significant bits of the eight-bit word from the GI register 121 since there are not ten bits. Thus, these last two bits (the two most significant bits from the voltage register 64) would appear as zeros in both the DAC 112 and the FOI register 125.

Since no voltage information from the FROS 51 is required for the droplets 23, which are directed to the gutter 27 (see FIG. 1), approximately the lowest twenty percent of the range of voltage numbers, which might appear in the voltage register 64 (see FIG. 2), are not used. Thus, one of these numbers in the voltage register 64 can be employed for controlling when the EOC signal from the EOC latch 55 goes high.

Therefore, when the character is to be ended, the voltage register 64 has the count of one therein so that $V=1$. This is utilized in conjunction with the RLM 65 of the run length counter 62 reaching the count of zero. Thus, when both of these occur and the T7 clock signal goes up, the EOC signal from pin 2 of the inverter module 124 (see FIG. 8) of the EOC latch 55 goes high. This is shown in FIG. 3A and occurs in the ending drop times including the last drop time of the previous printed character.

If desired, the grating counter 78 (see FIG. 2) could be made a function of the actual velocity of the carrier 12 (see FIG. 1) rather than being tied to the oscillator 19'. In this arrangement, the placement of the droplets 23 could be synchronized with the interpolated position of the carrier 12 every time that a sequence of four of the droplets 23 was to not be printed rather than waiting until the first such sequence occurs just after a grating pulse from the grating 15. This would more evenly spread the readjustment of the horizontal position and cause the droplets 23 to be placed closer to their ideal positions so that better print quality would result. However, such is not required for satisfactory operation of the present invention.

With the distance between adjacent grating lines in the grating 15 being about 4.17 mils (1/240") or about 0.0106 cm., one of the droplets 23 is produced for approximately each 0.13 mil (0.0003302 cm.) of travel of the carrier 12. This is determined by dividing the distance of 4.17 mils between adjacent grating lines by 32 droplets produced during the travel of the carrier 12 between adjacent grating lines. Since each of the droplets 23 has a diameter of 2 mils (0.00508 cm.) to 2½ mils (0.00635 cm.) in flight to produce a spot or dot having a diameter of about 5.9 mils (0.014986 cm.) when the droplet 23 strikes the recording surface 14, only one of the droplets 23 is required to strike the recording surface 14 at any specific vertical position between two of the adjacent grating lines of the grating 15. Typical line weights are approximately the width of two or three of the spots or dots produced by two or three of the droplets 23 striking the recording surface 14. Accordingly, any character can be produced during a portion of one of the movements of the carrier 12 along the horizontal axis in one of the directions.

As previously mentioned, there is a total of 7680 drop times per linear inch (3023.622 drop times per linear cm.) of travel of the carrier 12. When the characters have twelve pitch, each character has a total of 640 drop times available for printing. With ten pitch, there would be 768 drop times available for printing.

In FIG. 26, the character "W" has twelve pitch. Thus, it has a total of 640 drop times during which the ink dots 35 can be produced on the recording surface 14 by the droplets 23 striking the recording surface 14.

Figure 27:
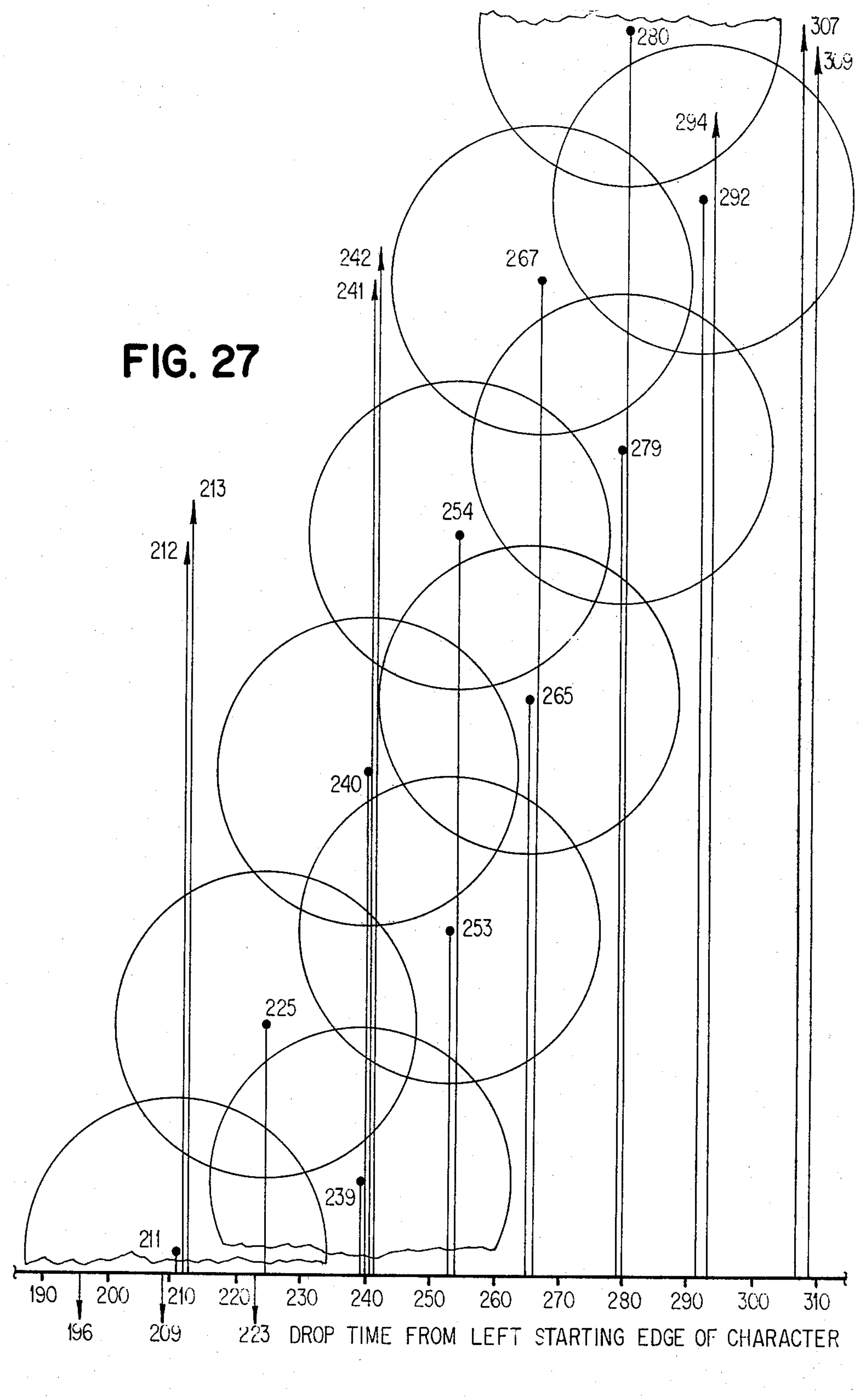
FIG. 27 is an enlarged view of a portion of the character "W" of FIG. 26 within the phantom block in FIG. 26 and showing the granular positions of the ink dots.

The portion of the character "W" within the phantom block in FIG. 26 is shown in FIG. 27 for the various drop times with the first drop time (not shown) starting at the left edge of the area in which the character is to be produced. Each of the dots 35, which is produced during the portion of the drop times indicated in FIG. 27, is identified in FIGS. 26 and 27 by having its center identified by the same numeral as the drop time.

The slanting of the vertical lines in FIG. 27 compensates for travel of the carrier 12 from left to right. This slanting allows the droplets 23 produced at different drop times to strike the recording surface 14 at the same horizontal location from a margin so that vertical lines can be easily produced. This slanting is produced by tilting the deflection plates 25 (see FIG. 1) and 26 slightly counterclockwise relative to the axis of the ink stream 21 when viewing the deflection plates 25 and 26 from the position of the nozzle 22.

As shown in FIG. 27, there are numerous positions in which the RLM 65 of the run length counter 62 has a count greater than three so that synchronization can occur. For example, there are nine of the droplets 23 unused between the drop times 213 and 223 so that synchronization could begin at the drop time 214.

It should be understood that each change of one in the binary count in the voltage register 64 corresponds to a change in vertical placement of the droplet 23 of approximately 0.2 mil (0.000508 cm.) while the drop time corresponds to a horizontal spacing of the droplets 23 of about 0.13 mil (0.0003302 cm.) from each other. In the claims, the term "granular position" refers to the possible location of the droplet 23 in the second direction being independent of the time sequence in which the droplets 23 are produced.

While the present invention contemplates printing of the characters only when the carrier 12 moves from left to right along the horizontal axis, it should be understood that such is not a requisite for satisfactory operation. That is, printing of characters could occur during movement of the carrier 12 in each direction along the horizontal axis.

While the control apparatus of the present invention has utilized a sixteen-bit word, it should be understood that the word could have a greater number of bits. If this were to occur, then the run length counter 62 could count to a higher level than 63.

If there were a sufficient number of bits, the run length counter 62 could use a sufficient number of these bits to count for the entire number of drop times required to produce one of the characters. In such an arrangement, the voltage from the voltage register 64 would always produce charging of one of the droplets 23 for printing when the run length counter 62 went to a count of zero except when the last drop time of the character occurred.

As used in the claims, the term "character" is not limited to a letter or a number or to any specific area. For example, as used in the claims, the term "character" includes designs of all types.

An advantage of this invention is that print quality is improved. Another advantage of this invention is that digitized appearance of characters is avoided. A further advantage of this invention is that it eliminates any need for printing droplets in a monotonically ascending sequence. Still another advantage of this invention is that it does not require any type of print matrix. A still further advantage of this invention is that it is independent of throughput.

While the invention has been particularly shown and described with reference to a preferred embodiment thereof, it will be understood by those skilled in the art that various changes in form and details may be made therein without departing from the spirit and scope of the invention.

What is claimed is:

1. An ink jet printer including:

means to produce ink droplets spaced substantially uniform distances from each other;

a recording surface;

first means to cause relative movement between said producing means and said recording surface along a first axis;

and second means to cause relative movement between said producing means and said recording surface in a second direction substantially orthogonal to the first axis;

the improvement comprising:

means to dispose each printed ink droplet on said recording surface at any granular position in the second direction substantially orthogonal to the first axis and along the first axis in accordance with a reference position;

charging means to selectively charge to a selected magnitude each of the droplets to be printed on said recording surface;

deflection means to deflect each of the droplets to be printed in the second direction in accordance with the magnitude of the charge thereon;

storage means to store information concerning each character to be printed on said recording surface, the information including the magnitude of the voltage to said charging means for each printed droplet forming part of the character and the spacing of each printed droplet along the first axis from a reference position;

and voltage applying means to apply a selected voltage to said charging means for each of the droplets to be printed in accordance with the information in said storage means to enable each of the droplets to be printed to have the selected magnitude thereon for deflection by said deflection means in the second direction to the desired position on said recording surface;

and means to synchronize the relative movement between said producing means and said recording surface along the first axis with respect to the spacing of one of the droplets to be printed from a reference position along the first axis at selected time intervals solely in accordance with when there is a predetermined spacing between adjacent printed droplets.

2. The improvement according to claim 1 including means to compensate for induction produced between adjacent droplets by selectively applying a voltage to said charging means only when a droplet is not to be printed and the non-printed droplet has a predetermined spacing from the last printed droplet in the path of the droplets from said producing means.

3. The improvement according to claim 2 in which said induction compensating means includes:

means responsive to the voltage applied to said charging means for each of a selected number of prior droplets;

storage means to store information relating to various voltages for supply to said charging means;

and said responsive means supplying an address to said storage means of said induction compensating means to select information in said storage means of said induction compensating means to cause supply of a voltage to said charging means for the non-printed droplet when the non-printed droplet has a predetermined spacing from the last printed droplet.

4. The improvement according to claim 2 in which said induction compensating means includes means to determine the magnitude of the selectively applied voltage for non-printed droplets in accordance with the voltage supplied to said charging means for each of a selected number of prior droplets when the non-printed droplet has a predetermined spacing from the last printed droplet.

5. The improvement according to claim 2 in which said droplet disposing means includes:

control means to control the time of application of a voltage to said charging means from said voltage applying means so that a voltage is applied to said charging means from said voltage applying means for at least each of the droplets to be printed;

and said control means including means to control when said induction compensating means selectively applies a voltage to said charging means.

6. The improvement according to claim 1 in which said synchronizing means includes:

signal supply means to supply a signal at selected times in accordance with the rate of relative movement between said producing means and said recording surface along the first axis;

first counting means to count at the rate of frequency of production of the droplets by said producing means from the start of the space allocated to each character;

count starting means to start counting in said first counting means each time that said signal supply means produces a signal, said first counting means stopping counting of the droplets when a predetermined number of droplets is produced by said producing means after each time that counting in said first counting means has been started;

second counting means to count down an initial count, representing the number of droplet spacings along the first axis from a reference position at which the next droplet is to be printed, at the rate of frequency of production of the droplets by said producing means;

third counting means to count at the rate of frequency of production of the droplets by said producing means from the start of the space allocated to a character;

and count stopping means to stop downcounting the count in said second counting means and upcounting the count in said third counting means only when said signal supply means produces one of the signals, the count in said third counting means exceeds the count in said first counting means, and the count in said second counting means exceeds a predetermined count until the counts in said first counting means and said third counting means are equal to synchronize the relative movement between said producing means and said recording surface along the first axis with respect to one of the droplets to be printed from a reference position along the first axis.

7. The improvement according to claim 1 in which said synchronizing means includes:

first counting means to count at the rate of frequency of production of the droplets by said producing means from the start of the space allocated to a character;

count starting means to start counting in said first counting means at selected times in accordance with the rate of relative movement between said producing means and said recording surface along the first axis, said first counting means stopping counting of the droplets when a predetermined number of droplets is produced by said producing means after each time that counting in said first counting means has been started;

second counting means to count down an initial count, representing the number of droplet spacings along the first axis from a reference position at which the next droplet is to be printed, at the rate of frequency of production of the droplets by said producing means;

third counting means to count at the rate of frequency of production of the droplets by said producing means from the start of the space allocated to a character;

and count stopping means to stop downcounting the count in said second counting means and upcounting the count in said third counting means only when said count starting means starts counting in said first counting means with the count in said third counting means exceeding the count in said first counting means and the count in said second counting means exceeding a predetermined count until the counts in said first counting means and said third counting means are equal to synchronize the relative movement between said producing means and said recording surface along the first axis with respect to one of the droplets to be printed from a reference position along the first axis.

8. An ink jet printer including:

means to produce ink droplets spaced substantially uniform distances from each other;

a recording surface;

first means to cause relative movement between said producing means and said recording surface along a first axis;

and second means to cause relative movement between said producing means and said recording surface in a second direction substantially orthogonal to the first axis;

the improvement comprising:

means to dispose each printed ink droplet on said recording surface at any granular position in the second direction substantially orthogonal to the first axis and along the first axis in accordance with a reference position;

said droplet disposing means including:

charging means to selectively charge to a selected magnitude each of the droplets to be printed on said recording surface;

deflection means to deflect each of the droplets to be printed in the second direction in accordance with the magnitude of the charge thereon;

storage means to store information concerning each character to be printed on said recording surface, the information including the magnitude of the voltage to said charging means for each printed droplet forming part of the character and the spacing of each printed droplet along the first axis from a reference position;

and voltage applying means to apply a selected voltage to said charging means for each of the droplets to be printed in accordance with the information in said storage means to enable each of the droplets to be printed to have the selected magnitude thereon for deflection by said deflection means in the second direction to the desired position on said recording surface;

and means to compensate for induction produced between adjacent droplets by selectively applying a voltage to said charging means only when a droplet is not to be printed and the non-printed droplet has a predetermined spacing from the last printed droplet in the path of the droplets from said producing means.

9. An ink jet printer including:

means to produce ink droplets spaced substantially uniform distances from each other;

a recording surface;

first means to cause relative movement between said producing means and said recording surface along a first axis;

and second means to cause relative movement between said producing means and said recording surface in a second direction substantially orthogonal to the first axis;

the improvement comprising:

means to dispose each printed ink droplet on said recording surface at any granular position in the second direction substantially orthogonal to the first axis and along the first axis in accordance with a reference position;

said droplet disposing means including:

storage means to store information concerning each character to be printed on said recording surface, the information including the position of each printed droplet forming part of the character relative to a single predetermined position in the second direction and the spacing of each printed droplet along the first axis from a reference position;

and deflection means to deflect each of the droplets to be printed in the second direction at the desired location along the first axis in accordance with the stored information in said storage means;

and means to synchronize the relative movement between said producing means and said recording surface along the first axis with respect to the spacing of one of the droplets to be printed from a reference position along the first axis at selected time intervals solely in accordance with when there is a predetermined spacing between adjacent printed droplets.

10. The improvement according to claim 9 in which said synchronizing means includes:

signal supply means to supply a signal at selected times in accordance with the rate of relative movement between said producing means and said recording surface along the first axis;

first counting means to count at the rate of frequency of production of the droplets by said producing means from the start of the space allocated to each character;

count starting means to start counting in said first counting means each time that said signal supply means produces a signal, said first counting means stopping counting of the droplets when a predetermined number of droplets is produced by said producing means after each time that counting in said first counting means has been started;

second counting means to count down an initial count, representing the number of droplet spacings along the first axis from a reference position at which the next droplet is to be printed, at the rate of frequency of production of the droplets by said producing means;

third counting means to count at the rate of frequency of production of the droplets by said producing means from the start of the space allocated to a character;

and count stopping means to stop downcounting the count in said second counting means and upcounting the count in said third counting means only when said signal supply means produces one of the signals, the count in said third counting means exceeds the count in said first counting means, and the count in said second counting means exceeds a predetermined count until the counts in said first counting means and said third counting means are equal to synchronize the relative movement between said producing means and said recording surface along the first axis with respect to one of the droplets to be printed from a reference position along the first axis.

11. The improvement according to claim 9 in which said synchronizing means includes:

first counting means to count at the rate of frequency of production of the droplets by said producing means from the start of the space allocated to a character;

count starting means to start counting in said first counting means at selected times in accordance with the rate of relative movement between said producing means and said recording surface along the first axis, said first counting means stopping counting of the droplets when a predetermined number of droplets is produced by said producing means after each time that counting in said first counting means has been started;

second counting means to count down an initial count, representing the number of droplet spacings along the first axis from a reference position at which the next droplet is to be printed, at the rate of frequency of production of the droplets by said producing means;

third counting means to count at the rate of frequency of production of the droplets by said producing means from the start of the space allocated to a character;

and count stopping means to stop downcounting the count in said second counting means and upcounting the count in said third counting means only when said count starting means starts counting in said first counting means with the count in said third counting means exceeding the count in said first counting means and the count in said second counting means exceeding a predetermined count until the counts in said first counting means and said third counting means are equal to synchronize the relative movement between said producing means and said recording surface along the first axis with respect to one of the droplets to be printed from a reference position along the first axis.

12. A method of controlling the position on a recording surface of each ink droplet of an ink stream to be printed thereon to form a character or desired figure or shape in which ink droplets of the stream are produced with substantially uniform distances therebetween and there is relative movement between the ink stream of droplets and the recording surface along a first axis and in a second direction substantially orthogonal to the first axis, the method including:

disposing each printed ink droplet on the recording surface at any granular position in the second direction substantially orthogonal to the first axis and along the first axis in accordance with a reference position;

selectively charging each of the droplets to be printed on the recording surface to a selected magnitude for the position of the droplets on the recording surface in the second direction;

deflecting each of the droplets to be printed in the second direction in accordance with the magnitude of the charge thereon;

storing information concerning each character to be printed on the recording surface with the information including the magnitude of the voltage for selectively charging each printed droplet forming part of the character to the selected magnitude and the spacing of each printed droplet along the first axis from a reference position;

and synchronizing the relative movement between the ink stream of droplets and the recording surface along the first axis with respect to the spacing of one of the droplets to be printed from a reference position along the first axis at selected time intervals solely in accordance with when there is a predetermined spacing between adjacent printed droplets.

13. The method according to claim 12 including compensating for induction produced between adjacent droplets by applying an electrostatic field of a selected magnitude to a droplet only when the droplet is not to be printed and the non-printed droplet has a predetermined spacing from the last printed droplet in the path of the droplets.

14. The method according to claim 13 including controlling when an electrostatic field of a selected magnitude is applied to compensate for induction produced between adjacent droplets.

15. The method according to claim 13 including determining the magnitude of the electrostatic field for non-printed droplets in accordance with the electrostatic field applied for each of a selected number of prior droplets when the non-printed droplet has a predetermined spacing from the last printed droplet.

16. A method of controlling the position on a recording surface of each ink droplet of an ink stream to be printed thereon to form a character or desired figure or shape in which ink droplets of the stream are produced with substantially uniform distances therebetween and there is relative movement between the ink stream of droplets and the recording surface along a first axis and in a second direction substantially orthogonal to the first axis, the method including:

disposing each printed ink droplet on the recording surface at any granular position in the second direction substantially orthongonal to the first axis and along the first axis in accordance with a reference position;

selectively charging each of the droplets to be printed on the recording surface to a selected magnitude for the position of the droplets on the recording surface in the second direction;

deflecting each of the droplets to be printed in the second direction in accordance with the magnitude of the charge thereon;

storing information concerning each character to be printed on the recording surface with the information including the magnitude of the voltage for selectively charging each printed droplet forming part of the character to the selected magnitude and the spacing of each printed droplet along the first axis from a reference position;

and compensating for induction produced between adjacent droplets by applying an electrostatic field of a selected magnitude to a droplet only when the droplet is not to be printed and the non-printed droplet has a predetermined spacing from the last printed droplet in the path of the droplets.

17. A method of controlling the position on a recording surface of each ink droplet of an ink stream to be printed thereon to form a character or desired figure or shape in which ink droplets of the stream are produced with substantially uniform distances therebetween and there is relative movement between the ink stream of droplets and the recording surface along a first axis and in a second direction substantially orthogonal to the first axis, the method including:

disposong each printed ink droplet on the recording surface at any granular position in the second direction substantially orthogonal to the first axis and along the first axis in accordance with a reference position;

storing information concerning each character to be printed on the recording surface with the information including the position of each printed droplet forming part of the character relative to a single predetermined position in the second direction and the spacing of each printed droplet from a reference position along the first axis;

deflecting each of the droplets to be printed in the second direction at the desired location along the first axis in accordance with the stored information;

and synchronizing the relative movement between the ink stream of droplets and the recording surface along the first axis with respect to the spacing of one of the droplets to be printed from a reference position along the first axis at selected time intervals solely in accordance with when there is a predetermined spacing between adjacent printed droplets.

18. An ink jet printer including:

means to produce ink droplets spaced substantially uniform distances from each other;

a recording surface;

first means to cause relative movement between said producing means and said recording surface along a first axis;

and second means to cause relative movement between said producing means and said recording surface in a second direction substantially orthogonal to the first axis;

the improvement comprising:

means to dispose each printed ink droplet on said recording surface at any granular position in the second direction substantially orthogonal to the first axis and along the first axis in accordance with a reference position;

said droplet disposing means including:

charging means to selectively charge to a selected magnitude each of the droplets to be printed on said recording surface;

deflection means to deflect each of the droplets to be printed in the second direction in accordance with the magnitude of the charge thereon;

and storage means to store information concerning each character to be printed on said recording surface, the information including the magnitude of the voltage to said charging means for each printed droplet forming part of the character and the spacing of each printed droplet along the first axis from a reference position;

counting means to receive a count from storage means in accordance with the spacing of the droplet to be printed along the first axis from a reference position, said counting means being counted down by a count of one at the rate of frequency of production of the droplets by said producing means;

and means responsive to said counting means reaching a count to zero to allow said charging means to charge the droplet to be printed on said recording surface to the selected magnitude.

19. The improvement according to claim 18 in which:

said droplet disposing means includes voltage applying means to apply a selected voltage to said charging means for each of the droplets to be printed in accordance with the information in said storage means to enable each of the droples to be printed to have the selected magnitude thereon for deflection by said deflection means in the second direction to the desired position on said recording surface;

and said responsive means allows said voltage applying means to apply the selected voltage to said charging means only when said counting means is at a count of zero.

20. The improvement according to claim 18 including means to selectively stop the downcounting of the count in said counting means when the count in said counting means is greater than a predetermined count to enable synchronization of the relative movement between said producing means and said recording surface along the first axis with respect to the spacing of one of the droplets to be printed from a reference position.

* * * * *